(12) United States Patent
Talpe

(10) Patent No.: US 8,905,218 B2
(45) Date of Patent: Dec. 9, 2014

(54) CONTROL ASSEMBLY FOR CONTROLLING THE ROTATION OF A TURNSTILE

(71) Applicant: Joseph Talpe, Heestert-Zwevegem (BE)

(72) Inventor: Joseph Talpe, Heestert-Zwevegem (BE)

(73) Assignee: Locinox, Waregem (BE)

( * ) Notice: Subject to any disclaimer, the term of this patent is extended or adjusted under 35 U.S.C. 154(b) by 0 days.

(21) Appl. No.: 14/051,994

(22) Filed: Oct. 11, 2013

(65) Prior Publication Data

US 2014/0102003 A1    Apr. 17, 2014

(30) Foreign Application Priority Data

Oct. 12, 2012   (EP) ..................................... 12188445

(51) Int. Cl.
*G07F 7/00*     (2006.01)
*E05F 15/02*    (2006.01)
*G07C 9/02*     (2006.01)
*E06B 11/08*    (2006.01)

(52) U.S. Cl.
CPC . *G07C 9/02* (2013.01); *E05F 15/02* (2013.01); *E06B 11/08* (2013.01); *Y10S 194/903* (2013.01)
USPC ............ 194/205; 194/247; 194/302; 194/903

(58) Field of Classification Search
CPC ............ E05F 15/02; G07C 9/02; E06B 11/08
USPC ................ 194/205, 247, 302, 903; 49/46, 47; 105/341, 341.5; 343/797; 346/42; D25/51; 340/5.2, 5.7, 5.8, 528; 232/41 C, 52, 61; 235/93, 379, 382, 235/384, 385, 375, 487, 492

See application file for complete search history.

(56) References Cited

U.S. PATENT DOCUMENTS 3,445,962 A    5/1969    Byland et al.
3,602,350 A    8/1971    Collins

FOREIGN PATENT DOCUMENTS

WO    2011/023793 A1    3/2011

*Primary Examiner* — Jeffrey Shapiro
(74) *Attorney, Agent, or Firm* — Sughrue Mion, PLLC

(57) ABSTRACT

A control assembly for controlling rotation of a turnstile, includes a torque-restoring mechanism (13) with springs (20), a motion converting transmission with a multiplying gearing (56, 57) converting a rotation of the turnstile over 120° into a rotation of the rotary shaft entering the hydraulic damper (26) over 180°. The hydraulic damper (26) has two pistons mounted onto a single piston rod. A cam or crank mechanism converts rotation of the rotary shaft into reciprocating motion of the two pistons. The first piston damps the rotary movement of the turnstile when moving in one direction while the other piston damps this movement when the pistons move in the other direction, therefore damping the turnstile in both directions. A motion converting transmission in combination with a double-piston mechanism avoids any loss of hydraulic fluid, while achieving a gradually increasing damping force to effectively stop the rotation of the turnstile.

15 Claims, 19 Drawing Sheets

CONTROL ASSEMBLY FOR CONTROLLING THE ROTATION OF A TURNSTILE

CROSS-REFERENCE TO RELATED APPLICATION

This application relates to and claims the benefit of priority from European Patent Application number 12188445.6, filed on Oct. 12, 2012, the entire disclosure of which is incorporated herein by reference.

The present invention relates to a control assembly for controlling the rotation of a turnstile comprising a rotary shaft with barrier arms spaced over an angle of x° from one another, which control assembly comprises:
- a frame;
- a hub on which the turnstile is adapted to rotate and which is rotatably mounted onto said frame;
- a torque-restoring mechanism defining 360/x home positions of said turnstile and restoring torque, which has been exerted onto the turnstile during substantially a first half of a part-rotational movement of the turnstile from one of said home positions to a next home position, during substantially a second half of said part-rotational movement so as to assist the rotation of the turnstile to said next home position; and
- a hydraulic damper for damping the movement of the said turnstile during the second half of said part-rotational movement, which damper comprises a cylinder-piston mechanism which contains a hydraulic fluid.

Turnstiles are used for controlling and/or monitoring passage of people between two distinct areas as in, for example, entrance and/or exit areas into, out or within various facilities such as garden centres, factory sites, sport fields, etc. Turnstiles may either be so-called full-height turnstiles, forming a rotary gate, or waist-height turnstiles. Full-height turnstiles usually comprise a cage-like structure including a vertically disposed pivot column having a number of vertically aligned series of barrier arms extending radially outwardly from the pivot column. In practice they usually contain three series of barrier arms but a larger number is also possible. To allow people to pass the rotary gate, this gate rotates over 120° in case the rotary gate comprises three series of barrier arms. Waist-height turnstiles often contain only three barrier arms which are mounted on an inclined rotary shaft. The barrier arms are also mounted in an inclined position onto the rotary shaft so that, in the home positions, the upper barrier arm is substantially horizontal whilst the other barrier arms are directed downwards. Such turnstiles are used for example at the entry of warehouses, tube stations, etc.

Turnstiles are provided with a control assembly for controlling the rotation of the turnstile. This control assembly usually comprises a ratchet mechanism for controlling the general direction of allowable rotation of the turnstile. Such ratchet mechanism may comprise one or two locking pawls. In the case of two locking pawls, a first one is intended to prevent rotation of the turnstile in one direction whilst the second one is intended to prevent rotation of the turnstile in the other direction. Both locking pawls can be brought either in a locking or an unlocking position. When they are both in their locking position, the turnstile is locked so that nobody can pass. When one locking pawl is in its unlocking position whilst the second locking pawl is in its locking position the turnstile can rotate in one direction, but not in the other direction, depending on which locking pawl is locked or unlocked. Locking or unlocking of these locking pawls can be done when mounting the control assembly on the turnstile but usually an access control mechanism is provided, for example a card, key or code operated access control mechanism enabling to lock or unlock the turnstile, or to enable people to pass in one particular direction.

When the turnstile is rotated between two of its home positions, it has first to be rotated manually over the first half of this part-rotational movement. During the second half of this part-rotational movement the rotation of the turnstile is assisted, or even carried out completely, by the torque-restoring mechanism, in particular by the energy stored in the resilient element or elements of this torque-restoring mechanism. The hydraulic damper is required to damp the movement of the turnstile when it is rotated by the torque-restoring mechanism so that the turnstile will not move at an excessive speed so as to strike the persons going through the turnstile in the back and perhaps injure them.

A problem of such turnstiles is that the torque-restoring mechanism and the hydraulic damper should co-operate in such a manner that when the torque-restoring mechanism starts to rotate the turnstile (at the beginning of the second half of the part-rotational movement between two home positions), rotation of the turnstile should initially only be minimally damped to maintain or increase the rotational speed of the turnstile whilst at the end of the part-rotational movement the hydraulic damper should provide the greatest damping force to slow down the turnstile sufficiently in order to stop in the next home position.

U.S. Pat. No. 3,445,962 discloses a waist-height turnstile which comprises three barrier arms rotating about a horizontal axis. It comprises a torque-restoring mechanism and a hydraulic damper formed by a cylinder-piston mechanism. The torque-restoring mechanism comprises a rotating cam member with three rollers (forming a triangle) which alternately displace a cam follower against the action of a resilient element (springs). The cam follower is directly connected to the cylinder of a hydraulic cylinder-piston damper mechanism so that this cylinder reciprocates together with the cam follower. Since the bearing surface of the cam follower is a straight surface, only a relatively small torque is exerted onto the rotating cam member when the torque-restoring mechanism starts to move the turnstile. To avoid damping of the turnstile rotation during that phase, the cylinder of the hydraulic damper has at the beginning of the returning stroke of the piston a larger diameter. Also at the end of this returning stroke the hydraulic cylinder has a larger diameter so that the final phase of the rotation is not damped as during that phase the springs have nearly returned to their unstretched position.

An important drawback of the turnstile mechanism disclosed in U.S. Pat. No. 3,445,962 is that the damper cylinder is moved up and down according to a translational movement by the cam follower of the torque-restoring mechanism so that the piston rod slides in and out off the cylinder-piston mechanism. As such a sliding piston needs to be wetted constantly with hydraulic oil, the use of such a sliding piston causes a loss of hydraulic oil which reduces the lifetime of the turnstile mechanism. In practice, turnstile mechanisms should however be maintenance free and should certainly not require a filling up of hydraulic liquid.

Another turnstile mechanism is disclosed in U.S. Pat. No. 3,602,350. In the turnstile mechanism illustrated in the drawings of this US patent the hydraulic damper is a rotary damper so that losses of hydraulic oil can be prevented more easily. However, a rotary damper is more complex and less easy to produce than a cylinder-piston mechanism. The rotor and the cooperating inner part of the housing should indeed be produced with very small tolerances in order to avoid an uncontrolled flow of hydraulic fluid between the housing and the rotor. Moreover, since turnstiles are often used outdoors, compensation of the effect of temperature variations on the viscosity of the hydraulic fluid are difficult to compensate in rotary dampers so that they often do not function optimally unless they are regularly adjusted.

A further drawback of the turnstile mechanism disclosed in U.S. Pat. No. 3,602,350 is that the rotary damper is actuated by means of a roller which is urged against a three-lobed camlike formation mounted for rotation on the hub of the turnstile. The spring used for urging this roller against the cam surface has to be sufficiently strong to avoid interruptions in the damping effect. However, this spring counteracts the torque-restoring mechanism so that the spring of this mechanism has to be made heavier and so that consequently a still larger torque has to be exerted initially onto the turnstile by the person going through that turnstile.

With respect to the rotary damper, U.S. Pat. No. 3,602,350 also proposes to replace the rotary damper illustrated in the figures by a double acting ram which is actuated positively in both senses, for example by a groove cam and captive cam-follower. Such a double acting ram, which is a kind of a cylinder-piston mechanism, has however the same disadvantages as the cylinder-piston mechanism disclosed in U.S. Pat. No. 3,445,962. The piston rod sliding in and out off the double acting ram cylinder-piston mechanism causes indeed also a loss of hydraulic fluid.

The cam used to actuate the double acting ram will be of a similar size as the three-lobed camlike formation provided for actuating the rotary damper. As each lobe has to move the piston of the double acting ram over two complete successive strokes, and each lobe has to be shaped to achieve the required variation in damping force, the camlike formation is quite large. As a result thereof, this camlike formation will always be situated outside the cylinder-piston mechanism so that a sliding movement of the piston rod in and out off this cylinder-piston mechanism cannot be avoided.

An object of the present invention is therefore to provide a new control assembly for a turnstile which contains a cylinder-piston mechanism with a translating piston for damping the movement of the turnstile and wherein the translational motion of the piston can easily be generated within the cylinder-piston mechanism, i.e. by a relatively compact motion converting mechanism, so that no piston rod sliding in and out off the cylinder-piston mechanism is required, or wherein in other words any loss of hydraulic fluid out off the hydraulic cylinder-piston mechanism can be prevented.

To this end, the cylinder-piston mechanism of the hydraulic damper of the control assembly according to the present invention is a double cylinder-piston mechanism which comprises a first piston reciprocating in a first cylinder and defining with the first cylinder a first cylinder cavity having a maximum size at the beginning of a first stroke of the first piston, a minimum size at the end of this first stroke and a maximum size at the end of a subsequent second stroke of the first piston, the second piston being coupled to the first piston to reciprocate simultaneously with the first piston so that said second cylinder cavity has a minimum size at the beginning of said first stroke of the first piston, a maximum size at the end of said first stroke and a minimum size at the end of said subsequent second stroke of the first piston. The first and second pistons are operatively connected to said hub via a motion converting transmission converting the part-rotational movement of the turnstile over x° between two successive home positions into a reciprocating motion of the first piston starting substantially in the middle of one of said first and said second strokes and ending substantially in the middle of the other one of said first and second strokes. The first cylinder cavity has a first inlet which is provided with a first one-way valve allowing flow of hydraulic fluid into the first cylinder cavity during said second stroke of the first piston and the second cylinder cavity has a second inlet which is provided with a second one-way valve allowing flow of hydraulic fluid into the second cylinder cavity during said first stroke of the first piston so that during said first stroke the rotational motion of the turnstile is mainly damped by the first piston whilst during said second stroke this rotational motion is mainly damped by the second piston. The first cylinder has a first damping outlet allowing a restricted flow of hydraulic fluid out off the first cylinder cavity at least during a first part of said first stroke of the first piston whilst the second cylinder has a second damping outlet allowing a restricted flow of hydraulic fluid out off the second cylinder cavity at least during a first part of said second stroke of the first piston. The first cylinder is provided with a first by-pass channel having an inlet and an outlet ending both in said first cylinder cavity at the beginning of said first stroke of the first piston, the first by-pass channel allowing flow of hydraulic fluid out off the first cylinder cavity when the first piston has passed the outlet of the first by-pass channel during a second part of said first stroke of the first piston. The second cylinder is provided with a second by-pass channel having an inlet and an outlet ending both in said second cylinder cavity at the beginning of said second stroke of the first piston, the second by-pass channel allowing flow of hydraulic fluid out off the second cylinder cavity when the second piston has passed the outlet of the second by-pass channel during a second part of said second stroke of the first piston.

The hydraulic damper comprises two pistons defining two cylinder cavities. The two pistons are coupled to move simultaneously in such a manner that when the first cylinder cavity becomes smaller, the second cylinder cavity becomes larger and vice versa. Due to the presence of the first and second inlets in both cylinder cavities, and the one-way valves provided therein, the two pistons function successively to damp the rotational motion of the turnstile. Each piston more particularly damps this rotational motion when it moves to reduce the size of the respective cylinder cavity or in other words when it pressurizes the hydraulic fluid contained in the cylinder cavity. In a first phase, starting from the middle of the first or second stroke, hydraulic fluid can flow out off the cylinder cavity through the by-pass channel when the piston has passed the outlet opening thereof so that the rotational motion of the turnstile is not damped (or to a much smaller extent which is also to be understood in the present specification under the wording "not damped"). In a second phase, when the piston performs the first half of its next stroke, the hydraulic fluid is expelled out off the cylinder cavity through the damping outlet which only allows a restricted flow of hydraulic fluid out of the cylinder cavity so that the rotational motion of the turnstile is damped. During the part-rotational movement of the turnstile between two successive home positions, the control assembly of the present invention first doesn't damp the rotational motion of the turnstile (when the pistons move from their middlemost (home) position to their outermost positions) but subsequently damps this rotational motion (when the pistons return to their middlemost positions). The same succession of damping and not-damping effects are achieved independent of the direction wherein the pistons start to move, i.e. independent of the rotation direction of the turnstile.

An important advantage of the double cylinder-piston mechanism providing such a succession of damping and non damping phases is that the pistons can be actuated by means of a simple motion converting mechanism, in particular with a simple rotating camshaft or crankshaft which causes the two pistons to perform two half strokes when it rotates over 180°. An advantage of the hydraulic damper of the present invention is indeed that, even when the connection between the cam or crank and the piston rod makes a simple circular movement, the damping force is initially very small and gradually increases towards the end of the damping phase. No special cam profile has thus to be provided (in contrast to the three-lobed cam profile used in U.S. Pat. No. 3,602,350 or the three rollers of U.S. Pat. No. 3,445,962) so that a compact cam or crank mechanism can be provided within the cylinder-piston mechanism. It is thus no longer necessary to provide a piston rod sliding in and out off the cylinder-piston mechanism. Instead, a simple rotating shaft can be used to enter the cylinder-piston mechanism, which can in particular be done through an opening in the upper side of the cylinder-piston mechanism so that no hydraulic fluid can leak out off the cylinder-piston mechanism. Moreover, the damping action is identical in both rotation directions so that the turnstile can be used in both directions. When using a cylinder-piston mechanism with only one single piston in combination with such a simple cam or crank mechanism wherein the connection between the cam or crank and the piston rod performs a circular movement, the required damping properties would on the contrary not be achieved since the damping effect would first increase to a maximum and would subsequently decrease again to a minimum. Consequently, when the turnstile needs to rotate at its maximum speed it would be maximally damped whilst when it reaches its end or home position, it would be minimally damped so that it will not be stopped efficiently.

In an advantageous embodiment of the control assembly according to the present invention, the motion converting transmission comprises a rotating shaft entering the cylinder-piston mechanism, in particular through an opening in an upper side thereof, and a motion converting mechanism between said rotating shaft and said first and second pistons which is contained in said cylinder-piston mechanism and which converts a rotational motion of said rotating shaft into a translational motion of said first and second pistons.

The motion converting mechanism may be a cam mechanism, said rotating shaft being a camshaft comprising at least one cam and actuating said first and second pistons through the intermediary of at least one piston rod, said cam comprising preferably a projection travelling in a transverse groove in the piston rod. The motion converting mechanism may also be a crank mechanism, said rotating shaft being a crankshaft comprising at least one crank which is connected by means of at least one piston rod to said first and second pistons.

To actuate the rotating shaft, the motion converting transmission comprises a gearing between said rotating shaft and said hub, which gearing is a multiplying gearing so that a rotation of said turnstile over x° causes a rotation of said rotating shaft over 180°, said multiplying gearing comprising preferably a gear wheel mounted onto said rotating shaft and a further gear wheel mounted onto said hub and engaging said gear wheel, the ratio of the number of teeth on said gear wheel to the number of teeth on said further gear wheel being equal to x/180.

Just like the cam or crank mechanism, such a gearing provides also a reliable and constant coupling between the rotating shaft and the hub so that the turnstile is always correctly and reliably damped. Moreover, no additional springs are needed to urge any cam followers against the cam, as it is the case in U.S. Pat. No. 3,602,350, so that the energy stored in the resilient element(s) of the torque-restoring mechanism is efficiently used for rotating the turnstile and in particular not for tensioning the spring or springs of the hydraulic damper again.

In a preferred embodiment of the control assembly according to the present invention, the outlets of the first and the second by-pass channel are provided in such locations in said first and second cylinders that said first piston passes the outlet of said first by-pass channel, and said second piston the outlet of said second by-pass channel, only after the turnstile has been rotated to have passed one of said home positions by at least 1°, preferably by at least 2° and more preferably by at least 3°, but preferably before the turnstile has been rotated to have passed said home position by less than 15° and preferably by less than 10°.

An advantage of this embodiment is that the turnstile is not only maximally damped just before reaching its end (home) position but that it is also maximally damped a few degrees after this end position. When the turnstile passes its end position due to its inertia, especially when it has been forced to rotate at a too high speed, it is quickly and effectively stopped by the hydraulic damper oscillating a few times about its end position.

The present invention also relates to a turnstile which comprises a rotary shaft with barrier arms spaced over an angle of x° from one another and which is provided with a control assembly according to the present invention.

Other particularities and advantages of the invention will become apparent from the following description of some particular embodiments of the turnstile and of the control assembly for controlling the rotation thereof in accordance with the present invention. The reference numerals used in this description relate to the annexed drawings wherein.

Figure 18:
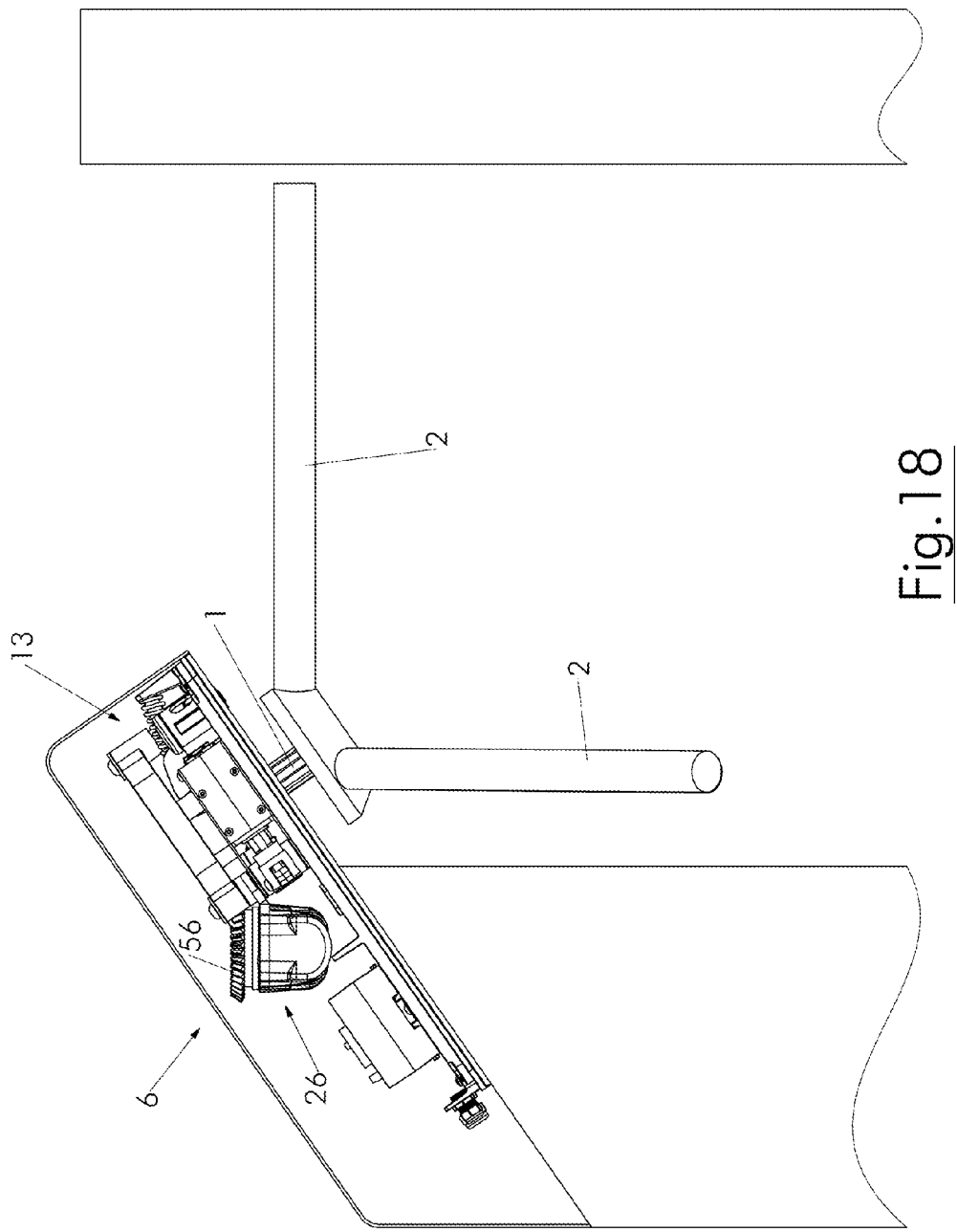
FIG. 18 is a side elevational view on a waist-height turnstile provided with a same control assembly as illustrated in the previous figures but adapted to the inclined orientation of the rotary shaft of the turnstile and of the control assembly itself.
Figure 19:
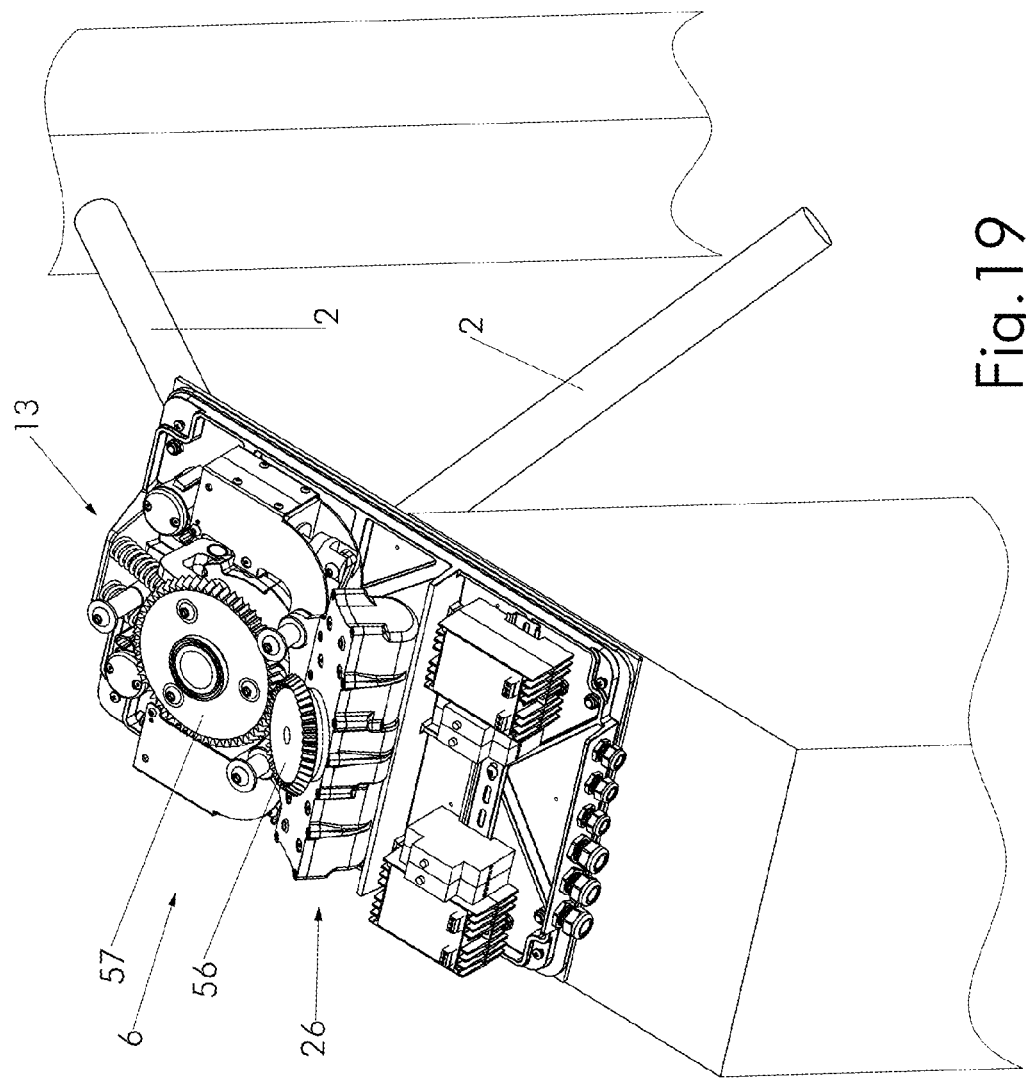
FIG. 19 is a perspective view from above on the turnstile and the control assembly shown in FIG. 18.

In the figures two different types of turnstiles are illustrated namely a full-height turnstile in FIGS. 1 to 4 and a waist-height turnstile in FIGS. 18 and 19. Both types of turnstiles comprise a rotary shaft 1 which is a vertical shaft in the full-height turnstile and which is inclined, in particular over an angle of about 45°, in the waist-height turnstile.

In the full-height turnstile illustrated in FIGS. 1 to 4 the vertical rotary shaft 1 is provided with three vertical series of barrier arms 2 which are spaced over an angle of 120° from one another. This turnstile co-operates with a cylindrically curved wall 3 (only illustrated in FIG. 4), extending over about 120° around the turnstile to form a passage way. Opposite the curved wall 3 is a fixed wall 4, comprising horizontal arms 5 extending radially towards the rotary shaft 1 of the turnstile and preventing passage of persons on that side of the turnstile. The barrier arms 2 are usually spaced over an angle of 120° but smaller angles are also possible when the turnstile comprises more (series of) barriers arms, for example 90° for four (series of) barrier arms.

Figure 1:
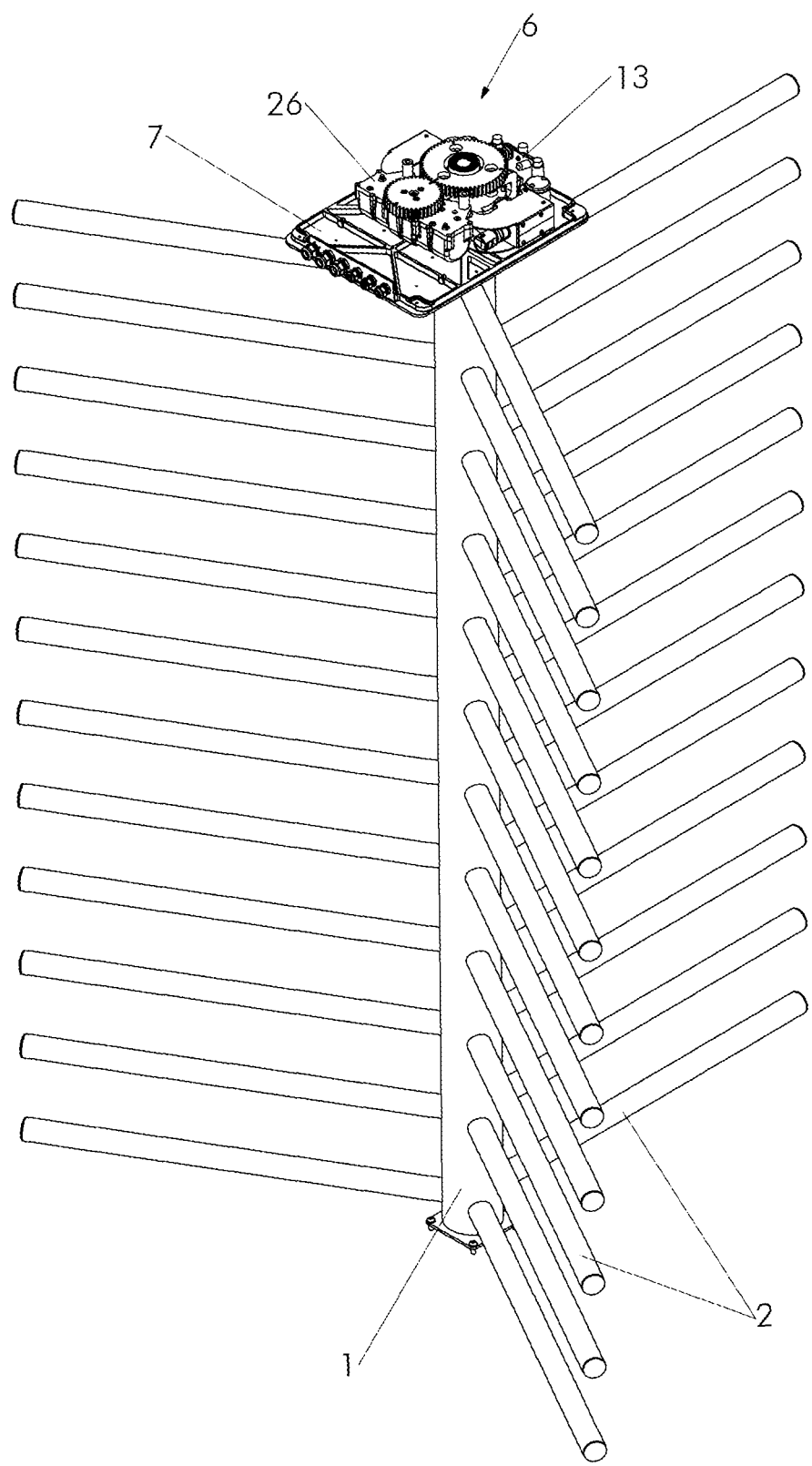
FIG. 1 is a perspective view on the main parts of a full-height turnstile and of the control assembly thereof according to a first embodiment of the invention.
Figure 2:
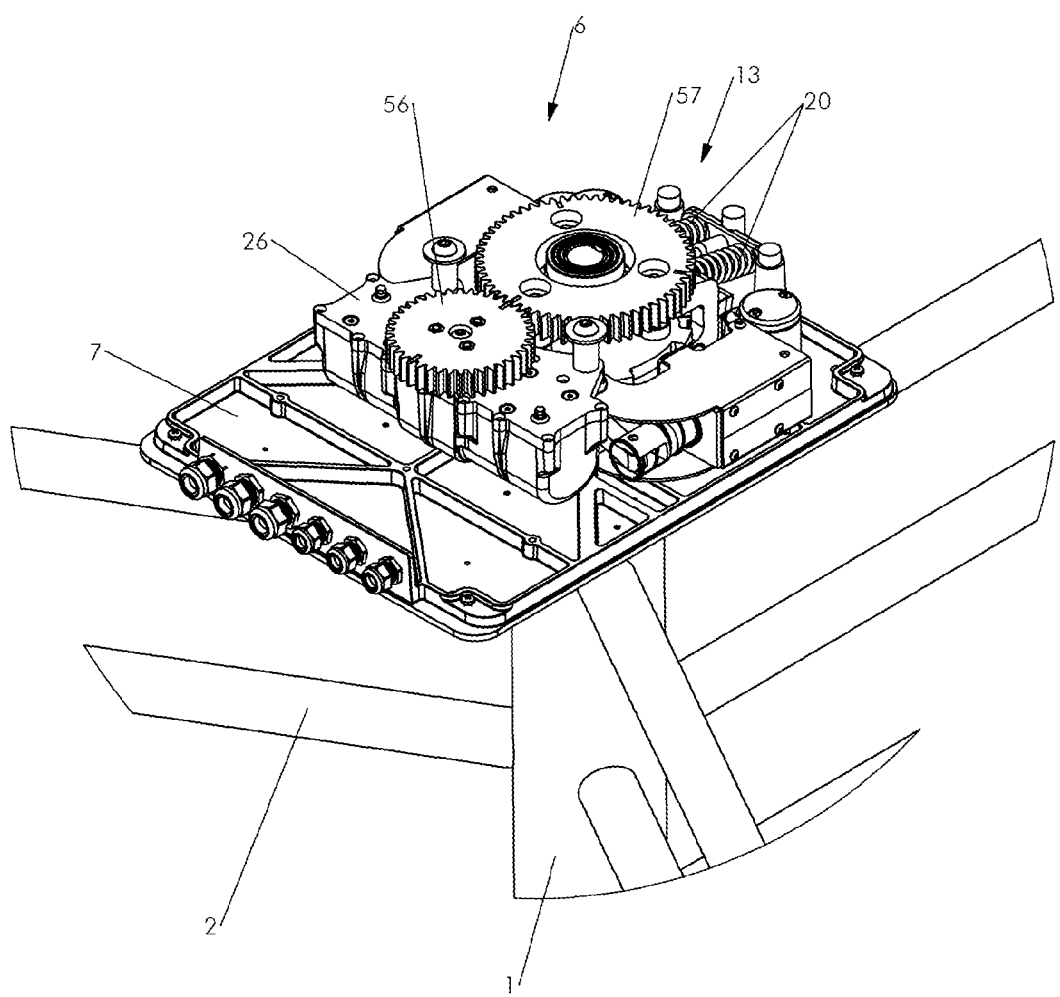
FIG. 2 is an enlarged view of the top portion of the turnstile and of the control assembly thereof shown in FIG. 1.
Figure 3:
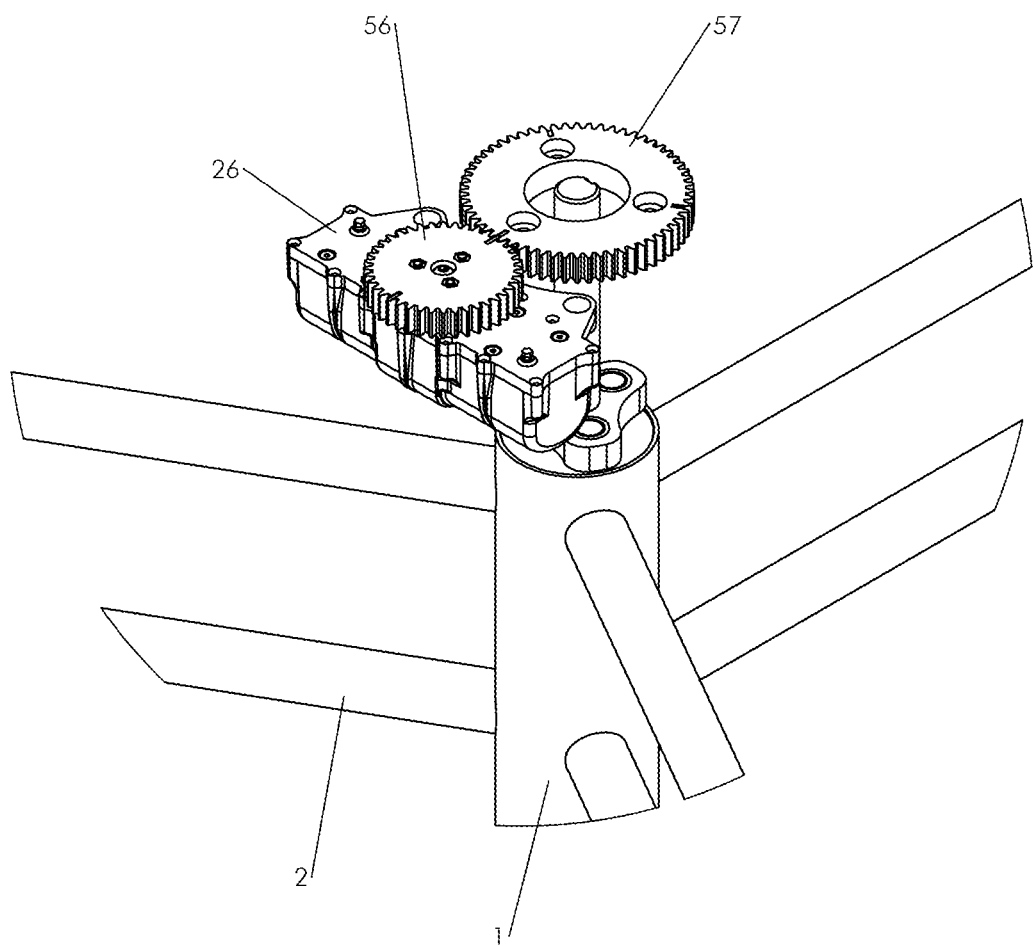
FIG. 3 is a same view as FIG. 2 but showing the control assembly having some parts removed therefrom.
Figure 4:
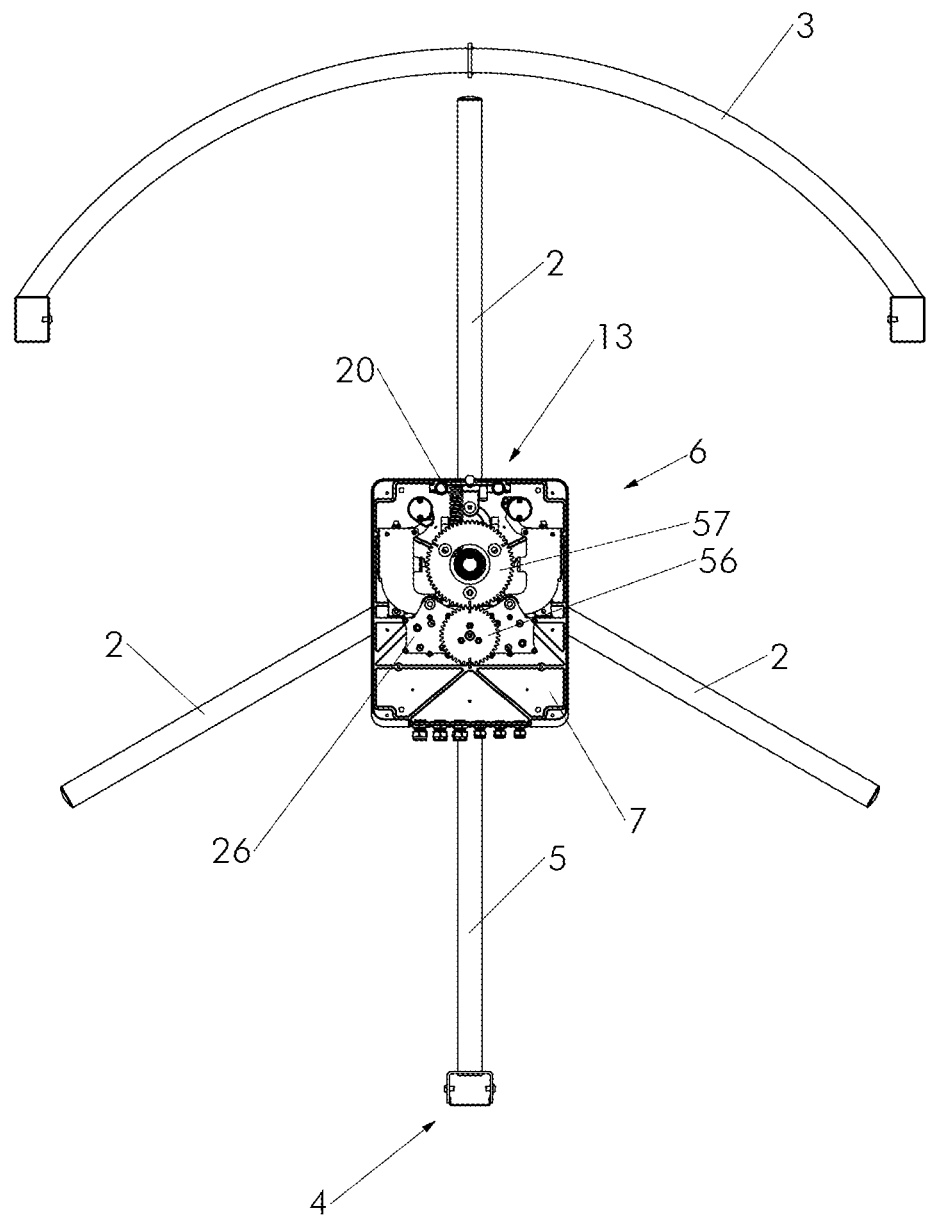
FIG. 4 is a top plan view on the turnstile and control mechanism shown in FIG. 1 and further on the fixed cage and wall positioned next to the turnstile.
Figure 5:
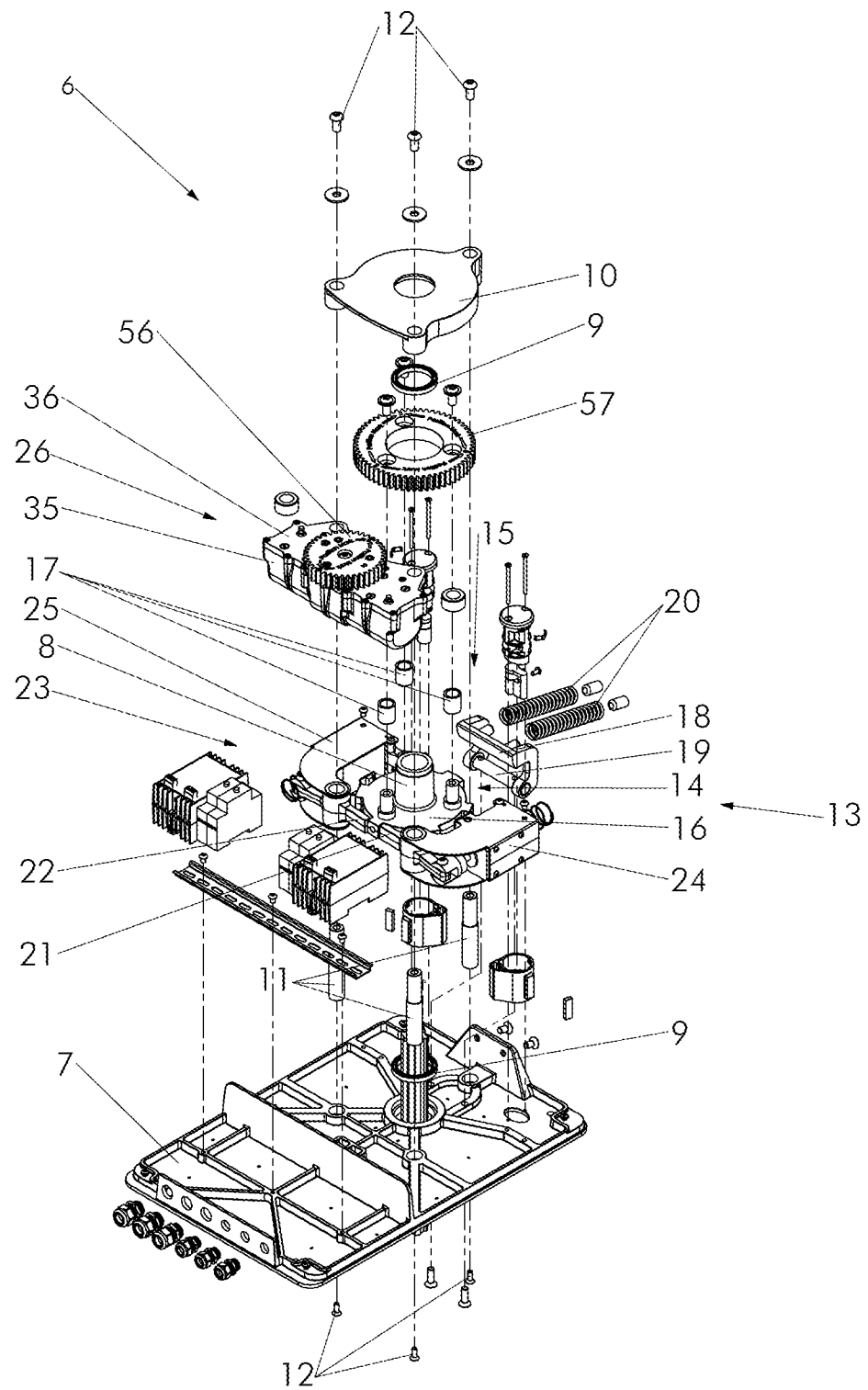
FIG. 5 is an exploded view of the control assembly illustrated partially in the previous figures.

The turnstile is provided with a control assembly 6 for controlling the rotation thereof. This control assembly 6 comprises a plate-like frame 7 and a hub 8 which is rotatably mounted onto this frame 7, more particularly through the intermediary of two ball bearings 9. As can be seen in FIG. 5 the hub 8 is caught between the base plate of the frame 8 and a top plate 10 fixed by means of substantially cylindrical distance holders 11 and bolts 12 to the base plate of the frame 7. The hub 8 is arranged to be secured fast to the rotary shaft 1 of the turnstile so that the turnstile can rotate on this hub 8.

The control assembly 6 further comprises a torque-restoring mechanism 13 defining three home positions of the turnstile (in general the number of home positions is equal to the number of (series of) barrier arms 2). The torque-restoring mechanism 13 comprises a rotating cam member 14 which is operatively secured to the hub 8 and a cam follower 15 which cooperates with the cam member to define the home positions of the turnstile. The rotating cam member 14 consists of a plate-like element 16 fixed to the hub 8 and provided on its upper surface with three rollers 17, forming the corners of a triangle and having rotation axes which are parallel to the rotation axis of the hub 8. The cam follower 15 comprises a straight contact surface 18 which is arranged to cooperate with the three rollers 17 and which is pivoted on a pivot 19 that extends at right angles to the rotation axis of the hub 8. Resilient means, more particularly two compression springs 20, urge the straight contact surface 18 of the cam follower 15 against the rollers 17 of the cam member 14. Due to the fact that these rollers 17 form a triangle and that the cam follower 15 is arranged to be urged against two adjacent rollers 17 of the cam member 14, this cam member 14 and the cam follower define the home positions of the turnstile, the number of rollers on the cam member being indeed equal to the number of (series of) barrier arms 2 on the turnstile. Moreover, the springs 20 generally bias the turnstile to one of its home positions so that during a first half of each part-rotational movement of the turnstile from one of its home positions to a next one of its home positions the torque exerted by the person passing through the turnstile onto the arms thereof compresses the compression springs 20 so that an amount of potential energy is stored in the torque-restoring mechanism 13. During the second half of the part-rotational moment of the turnstile, the compression springs 20 are extended again and exert a pushing force onto the roller 17 rolling over the contact surface 18 of the cam follower 15 thereby exerting a torque onto the cam member 14 and the turnstile connected thereto. In this way, the potential energy stored in the springs is at least partially converted into kinetic energy of the turnstile. The torque which has been exerted onto the turnstile during the first half of the part-rotational movement is thus at least partially restored to the turnstile to assist the rotation of the turnstile to its next home position.

The control assembly of a turnstile in general comprises a ratchet mechanism for controlling the general direction of allowable rotation of the turnstile. In the control assembly illustrated in the drawings the ratchet mechanism comprises a rotating notched circular member, in this case the plate-like element 16 of the torque-restoring mechanism 13, which is operatively connected to the hub 8 and two locking pawls 21, 22 which are each movable between a locking and an unlocking position. When it is in its locking position, the first locking pawl 21 enables rotation of the turnstile in a first direction (clockwise direction in FIG. 5) but locks the turnstile for rotation in the other direction. When it is in its locking position, the second locking pawl 22 enables rotation of the turnstile in a second direction (counter-clockwise direction in FIG. 5), which is opposite to the first direction, but locks the turnstile for rotation in this first direction (clockwise direction).

The control assembly may comprise only one locking pawl to enable a free passage in one direction but to prevent a passage in the other direction. The control assembly however preferably comprises an access control mechanism 23. In the case of only one locking pawl, this could be a key operated mechanism enabling to unlock the locking pawl to enable to pass the turnstile in both directions.

In the control assembly illustrated in FIG. 5 the access control mechanism 23 comprises a first electromagnet 24 for moving the first locking pawl 21 from its locking to its unlocking position and a second electromagnet 25 for moving the second locking pawl 21 from its locking to its unlocking position. When none of the electromagnets 24 and 25 are actuated, both locking pawls 21 and 22 are locking the turnstile so that, as shown in FIG. 5, the turnstile is completely locked. The electromagnets 24 and 25 can preferably be actuated by means of a key, card or code mechanisms on the two sides of the turnstile, the first electromagnet 24 being operable from one side of the turnstile whilst the second electromagnet 25 can be operated from the other side of the turnstile. In an alternative fail-safe arrangement, the locking pawls can be brought in their locking position by means of the electromagnets against the action of a spring so that the turnstile is unlocked in case of a power failure.

An essential feature of the control assembly of the present invention is the hydraulic damper 26 which is used to damp the movement of the turnstile when it is moved by the torque-restoring mechanism 13 during the second half of the part-rotational movement between two successive home positions.

Figure 7:
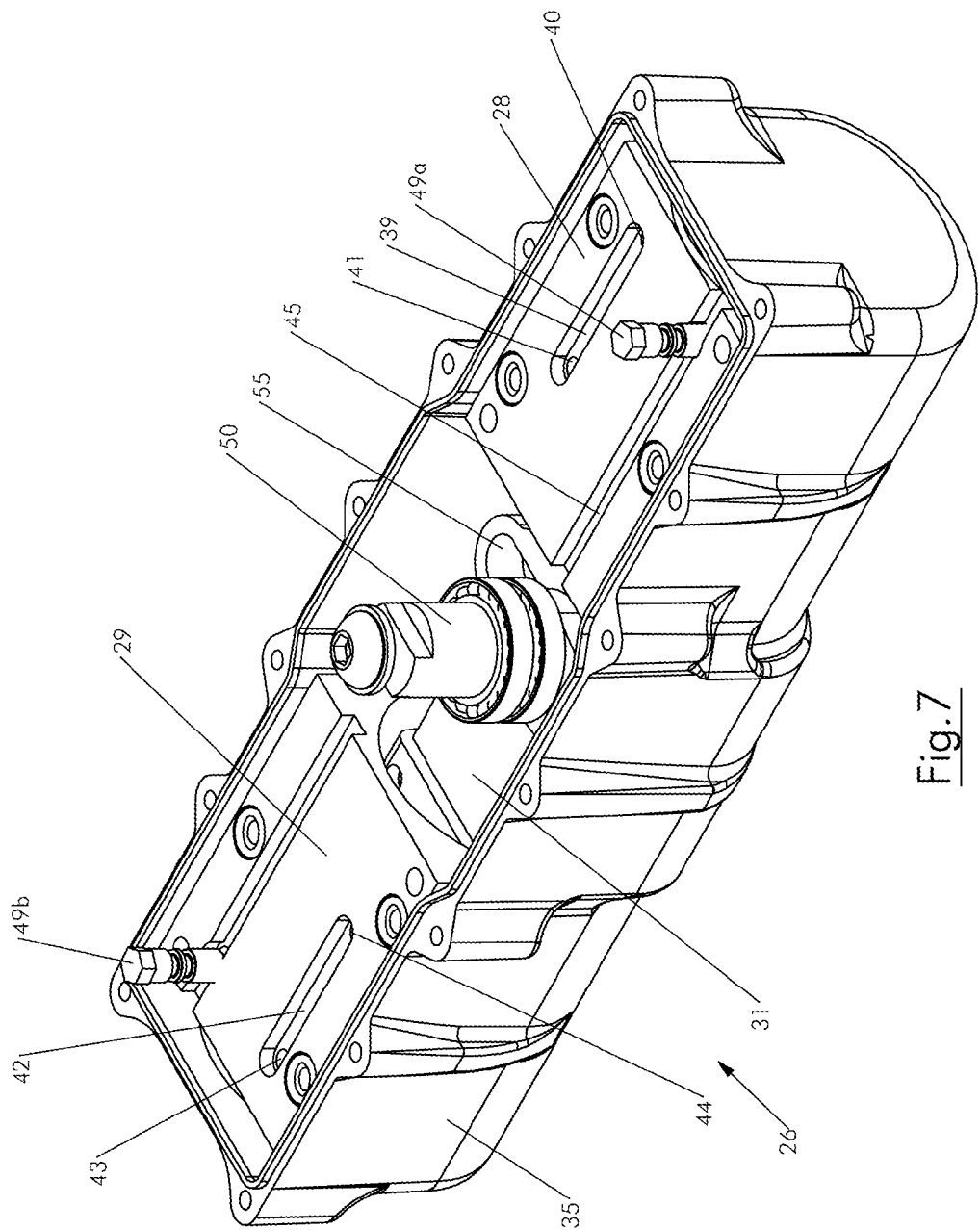
FIG. 7 is, on a still larger scale, a perspective view on the hydraulic damper of the control mechanism with the cover removed.
Figure 8:
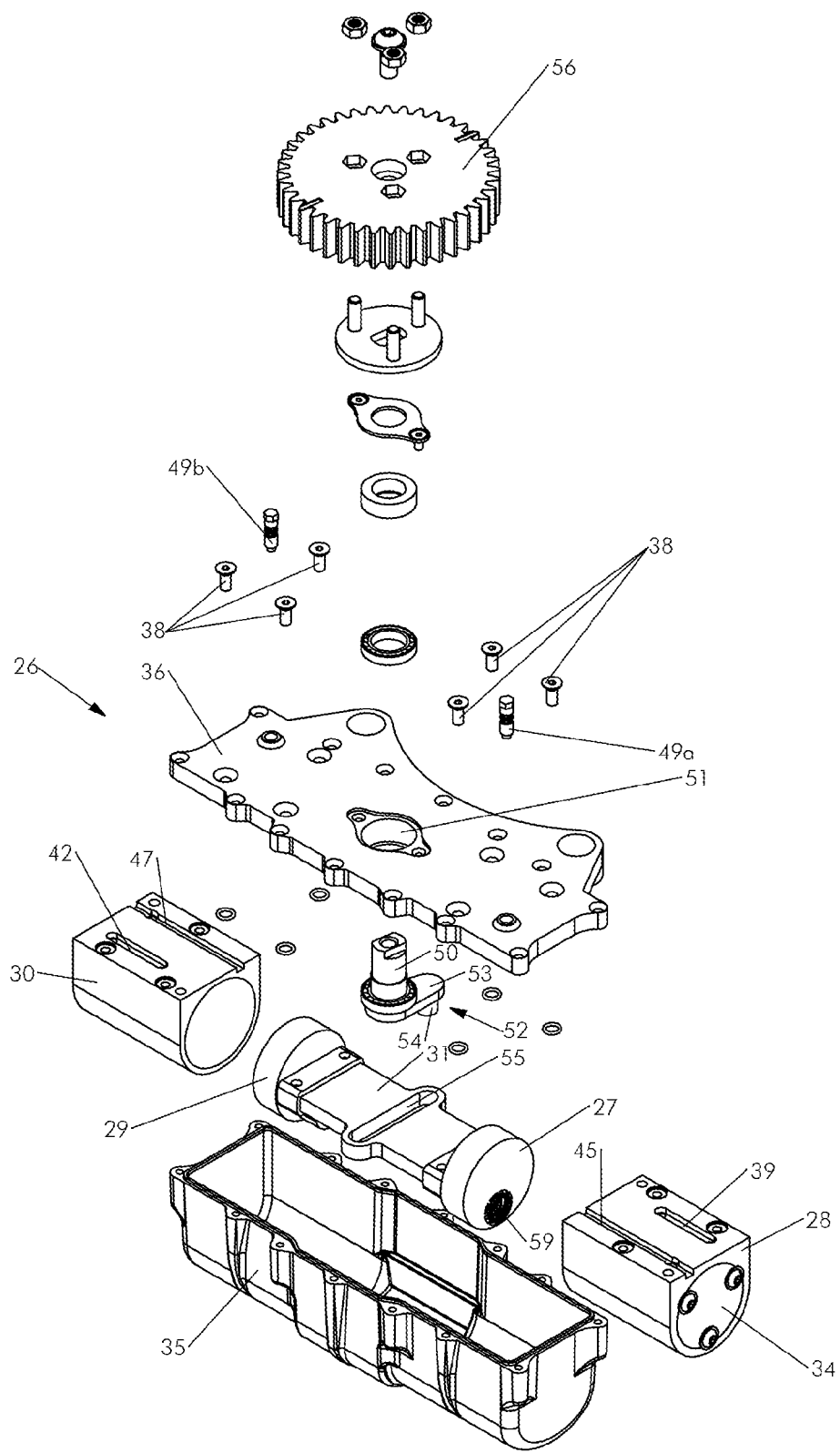
FIG. 8 is an exploded view on the components of this hydraulic damper.

Turning to FIGS. 7 and 8, the hydraulic damper 26 comprises a double cylinder-piston mechanism formed by a first piston 27 reciprocating in a first cylinder 28 and a second piston 29 reciprocating in a second cylinder 30. The first piston 27 is directly connected by means of a piston rod 31 to the second piston 29 so that both pistons reciprocate simultaneously. The two cylinders 28 and 30 are separate parts having a cylindrical hole which is closed off, on the outside, by means of a cover plate 32 but which is open, on the inside, so that the piston 27 or 29 can be slid in the cylinder. Within the first cylinder 28 the first piston 27 defines with the first cylinder 28 a first cylinder cavity 32 whilst within the second cylinder 30 the second piston 29 defines together with the second cylinder 30 a second cylinder cavity 33.

The two cylinders slid on the two pistons are applied as a whole in an elongated box 35 which is filled with hydraulic fluid (oil). The box 35 doesn't show openings so that no fluid can seep out off this box. At the top, the box 35 is closed off by means of a lid 36 screwed onto the box 35 by means of screws 37. The two cylinders 28 and 30 are fixed into the box 35 by being screwed, by means of screws 38, with their upper faces against the bottom side of the lid 36.

In the upper face of the first cylinder 28 a first by-pass channel 39 having at its extremities respectively an inlet 40 and an outlet 41 giving both access to the first cylinder cavity 32 is made near the closed off extremity of the first cylinder 28. In the same way, a second by-pass channel 42, having at its extremities respectively an inlet 43 and an outlet 44 giving both access to the second cylinder cavity 33 is made in the upper face of the second cylinder 30 near the closed off extremity thereof. Moreover, a first damping channel 45, connected via a first inlet 46 to the first cylinder cavity 32 is additionally made in the upper face of the first cylinder 28 whilst a second damping channel 47, connected via a second inlet 48 to the second cylinder cavity 33 is additionally made in the upper face of the second cylinder 30. In contrast to the first and second by-pass channels 39 and 42, the first and second damping channels 45 and 47 both end in the box 35 itself instead of in the cylinder cavities. Consequently, when the hydraulic fluid is pressurized by means of the pistons in the cylinder cavities, it can always be expelled out of the cylinder cavities through the inlets 46 and 48 of the damping channels 45 and 47, which are provided near the side of the cylinder cavities which are closed off by the cover plates 34.

Figure 6:
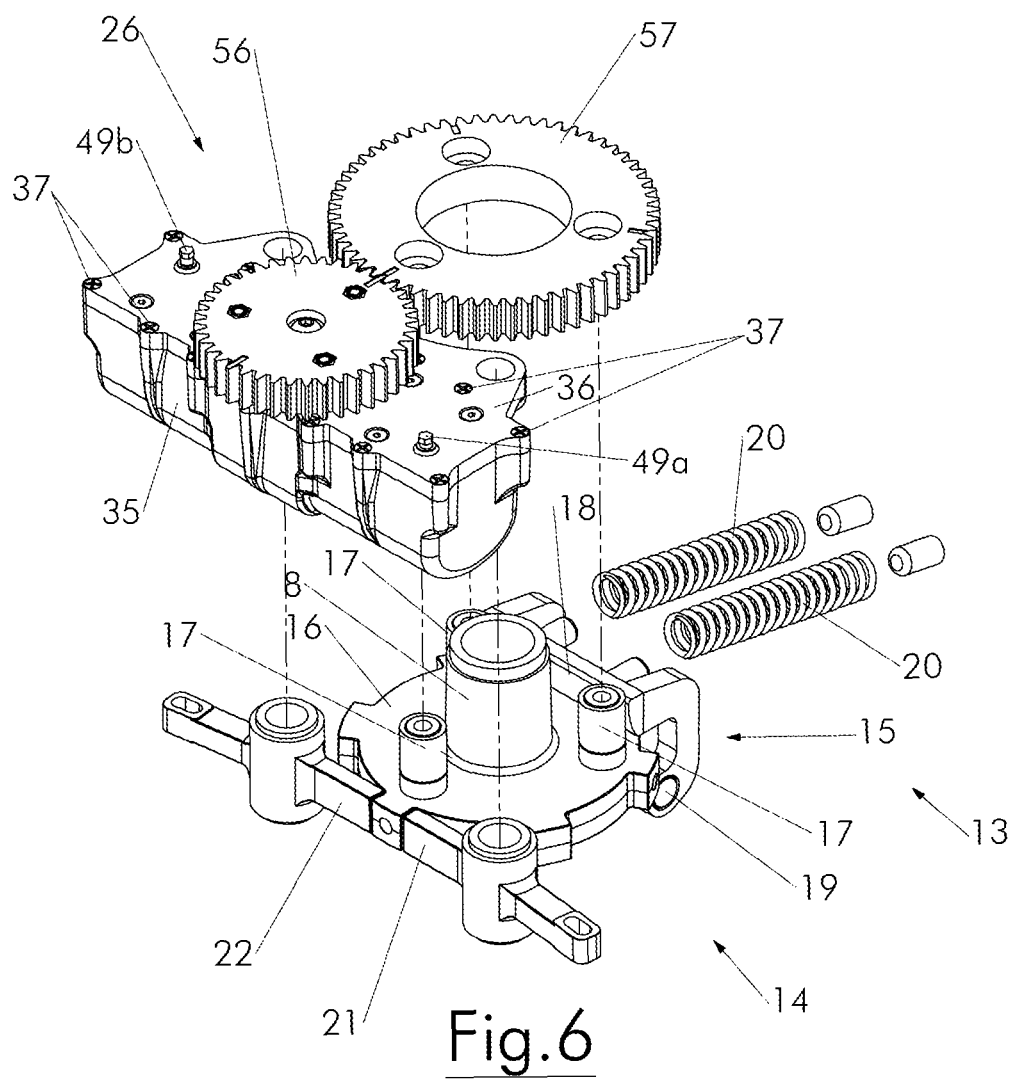
FIG. 6 is, on a somewhat larger scale, an exploded view of the main parts of the control assembly shown in FIG. 5.

The damping channels 45 and 47 form damping outlets which only allow a restricted flow of hydraulic fluid out of the cylinder cavities. In order to be able to control this restricted flow of hydraulic fluid, the damping channels 45 and 47 are respectively provided with a first adjustable flow control valve 49a and with a second adjustable flow control valve 49b, which are in particular needle valves. As can be seen in FIG. 6, these needle valves 49a and b extend through the lid 36 so that they are accessible from the outside of the hydraulic damper 26.

To enable the pistons 27 and 29 to damp the movement of the turnstile, they are operatively connected to the hub 8 via a motion converting mechanism. This mechanism converts the part-rotational movement of the turnstile over 120° between two successive home positions into a reciprocating motion of the two pistons. The motion converting mechanism comprises a rotating shaft 50 entering the cylinder-piston mechanism, more particularly the box 35 filled with hydraulic fluid, through an opening 51 in the lid 36 (i.e in the upper side) thereof. In this way, no hydraulic fluid can escape out of the hydraulic damper, in particular not along this rotating shaft 50.

In the embodiment illustrated in the drawings, the motion converting mechanism is a cam mechanism wherein a cam 52 is provided on the rotating shaft 50 so that this rotating shaft 50 forms a cam shaft. The cam 52 is formed by a radial arm 53 on the lower extremity of the rotating shaft 50 which carries at its distal extremity a downward projection 54 reciprocating in a transverse groove 55 in the piston rod 31. Upon rotation of the cam 52 over 360°, the first piston 27 performs two successive strokes.

In the present specification, the first stroke of the first piston 27 is defined as the stroke, at the beginning of which the first cylinder cavity 32 has its maximum size and at the end of which this first cylinder cavity 32 has its minimum size. The second stroke of the first piston 27 is defined as the subsequent stroke, at the beginning of which the first cylinder cavity 32 has its minimum size and at the end of which this first cylinder cavity 32 has its maximum size. The second piston 29 reciprocates simultaneously with the first piston 27 and is coupled in such a manner thereto that the second cylinder cavity 33 has a minimum size at the beginning of the first stroke of the first piston 27, a maximum size at the end of this first stroke and a minimum size at the end of the subsequent second stroke of the first piston 27. In the embodiment illustrated in the drawings, this coupling of the two pistons 27 and 29 is realized by means of the common piston rod 31 so that both pistons move simultaneously in the same direction, the two cylinder cavities 32, 33 being provided on opposite sides of the pistons.

Instead of a cam mechanism 52, 55, the motion converting mechanism could also be formed by a crank mechanism, which is however not shown in the figures. In such a mechanism, the rotating shaft 50 is a crank shaft which comprises at least one crank connected by means of at least one piston rod to the two pistons 27 and 29. In case of a crank mechanism, each of the pistons 27, 29 is preferably connected by means of a separate piston rod to the crank. It is also possible to provide two cranks on the crank shaft, more particularly so that the two pistons move simultaneously but in opposite directions. In that case, the two cylinders 28 and 30 can also be positioned along each other instead of opposite one another.

The motion converting transmission between the hub 8 (or the turnstile) and the two pistons 27 and 29 comprises moreover a gearing, formed by two toothed gear wheels 56, 57, arranged between the hub 8 and the rotating shaft 50 entering the hydraulic damper 26. This gearing is a multiplying gearing so that a rotation of the turnstile over an angle of x° between two of its home positions, i.e. a rotation of the turnstile over 120°, is converted in a rotation of the rotating shaft 50 over 180°. To achieve this, the ratio between the number of teeth on the first gearwheel 56, mounted on the rotating shaft 50, and the number of teeth on the second gearwheel, mounted on the hub 8, is equal to x/180, or in case of a turnstile with three (series of) barrier arms 2, this ratio is equal to 2/3 (=120/180).

When assembling the control assembly, the two gearwheels 56 and 57 are coupled in such a manner to one another that in the home positions of the turnstile (defined by the torque-restoring mechanism 13), the first piston 27 is substantially in the middle of its first or second stroke (depending on the direction the turnstile will be rotated). When the turnstile is rotated from one of its home positions to its next one, the first piston 27 thus reciprocates over one stroke length from the middle of its above described first stroke to the middle of its above described second stroke, or, when the turnstile is rotated in the opposite direction, from the middle of its second stroke to the middle of its first stroke. To achieve in the two rotation directions of the turnstile a same damping effect, damping of the movement of the turnstile is mainly provided by the first piston 27 when the turnstile is rotated in one direction and mainly by the second piston 29 when the turnstile is rotated in the other direction.

In order to switch between the two pistons 27 and 29, the first cylinder cavity 32 has a first inlet 58, provided in the first piston 27 itself, which is provided with a first one-way valve 59 allowing flow of hydraulic fluid into the first cylinder cavity 32 during the second stroke of the first piston 27 (i.e. when the first piston 27 moves to increase the size of the first cylinder cavity 32) and the second cylinder cavity 33 has a second inlet 60, provided in the second piston 29, which is provided with a second one-way valve 61 allowing flow of hydraulic fluid into the second cylinder cavity during the first stroke of the first piston 27 (i.e. when the second piston 29 moves to increase the size of the second cylinder cavity 33). During the first stroke of the first piston 27 the damping effect is thus mainly provided by the first piston 27 whilst during said second stroke of the first piston 27 this damping effect is mainly provided by the second piston 29. The term "mainly" is used here to indicate that either all of the damping effect is provided by the respective piston or at least the largest part thereof, in particular more than 50%, preferably more than 70% or even more than 90% of the total amount of energy absorbed by the hydraulic damper is absorbed by the cylinder piston mechanism comprising the first piston 27 during the first stroke thereof and by the cylinder piston mechanism comprising the second piston 29 during the second stroke of the first piston 27. The other cylinder piston mechanism will always provide for some damping as the piston thereof always has to move through the hydraulic fluid, even when the one-way valve is open.

The first and the second one-way valves 59 and 61 each comprises a valve body 62 which is urged by a spiral spring 63 against a valve seat formed by the first and the second inlets 58, 60. When the piston moves to increase the size of the cylinder cavity, the pressure is reduced in this cylinder cavity and the respective one-way valve 59 or 61 is opened by the pressure exerted thereon by the hydraulic fluid. Each of the one-way valves 59 and 61 show a central duct in their valve body 62, which central duct is provided with a relief valve 64 allowing flow of hydraulic fluid in the other direction through the valve, but only in case a too high pressure is exerted by the piston on the hydraulic fluid in the cylinder cavity. This relief valve 64 is thus a safety valve avoiding too high forces on the control assembly, for example when a vandal pushes with a large force against the turnstile to rotate it with a high speed whilst being damped by the hydraulic damper.

Figure 9:
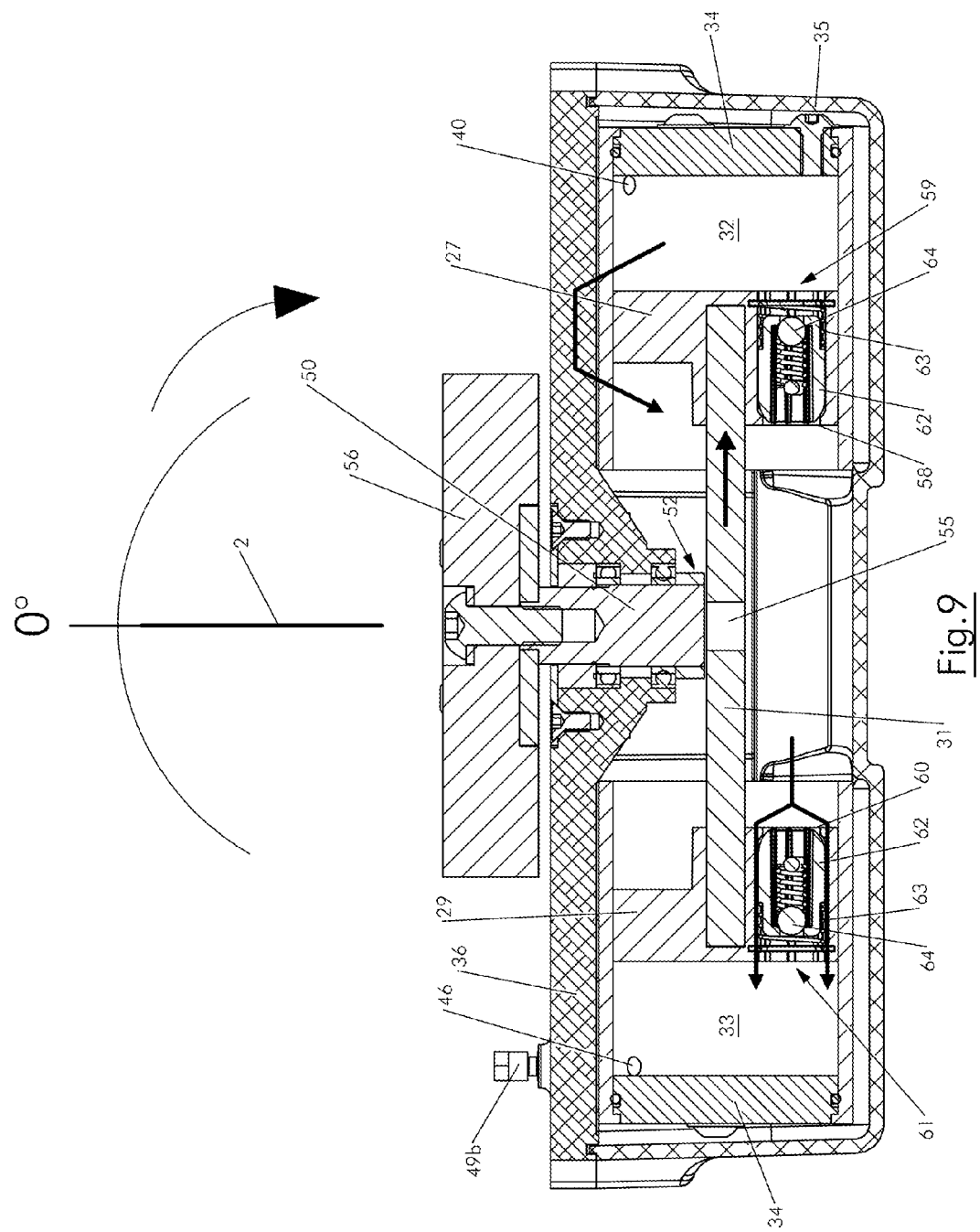
FIGS. 9 to 16 are longitudinal sectional views, in a vertical direction, through the hydraulic damper of the control assembly illustrated in the previous figures in different angular positions, illustrated schematically in these figures, of the turnstile.

FIG. 9 shows the hydraulic damper 26 with the first piston 27 in the middle of its first stroke (the pistons are moving to the right in this figure), i.e. when the turnstile is in one of its home positions (rotation angle 0°) and starts to rotate, as indicated in FIG. 9, in a clockwise direction. During this clockwise rotation, the first piston 27 (on the right hand side) and the second piston 29 (on the left hand side) move to the right. The hydraulic fluid opens the one-way valve 59 in the second piston 29 so that the pressure in the second cylinder cavity 33 is only slightly reduced and the second piston 29 nearly doesn't damp the rotation of the turnstile. The one-way valve 59 in the first piston 27 is however closed so that the hydraulic fluid is pressurized in the first cylinder cavity 32. The outlets 41 and 44 of the by-pass channels 39 and 42 are provided in such a location in the cylinders 28 and 30 that at the beginning of a rotational movement of the turnstile (starting from one of its home positions), the piston which provides the damping effect only passes the respective outlet when the turnstile has rotated over a small angle, in particular over an angle of at least 1°, preferably at least 2° and more preferably at least 3°, but in particular over an angle of less than 15°, preferably less than 10°.

In FIG. 9 the outlet 41 of the first by-pass channel 39 cannot be seen since the first piston 27 has not yet passed this outlet 41. In this position, the rotation of the turnstile is damped since the hydraulic fluid is pressurized by the first piston 27 in the first cylinder cavity 32 and can only flow out off this cylinder cavity 32 through the inlet 46 of the first damping channel 45 allowing only a restricted flow of hydraulic fluid.

Figure 10:
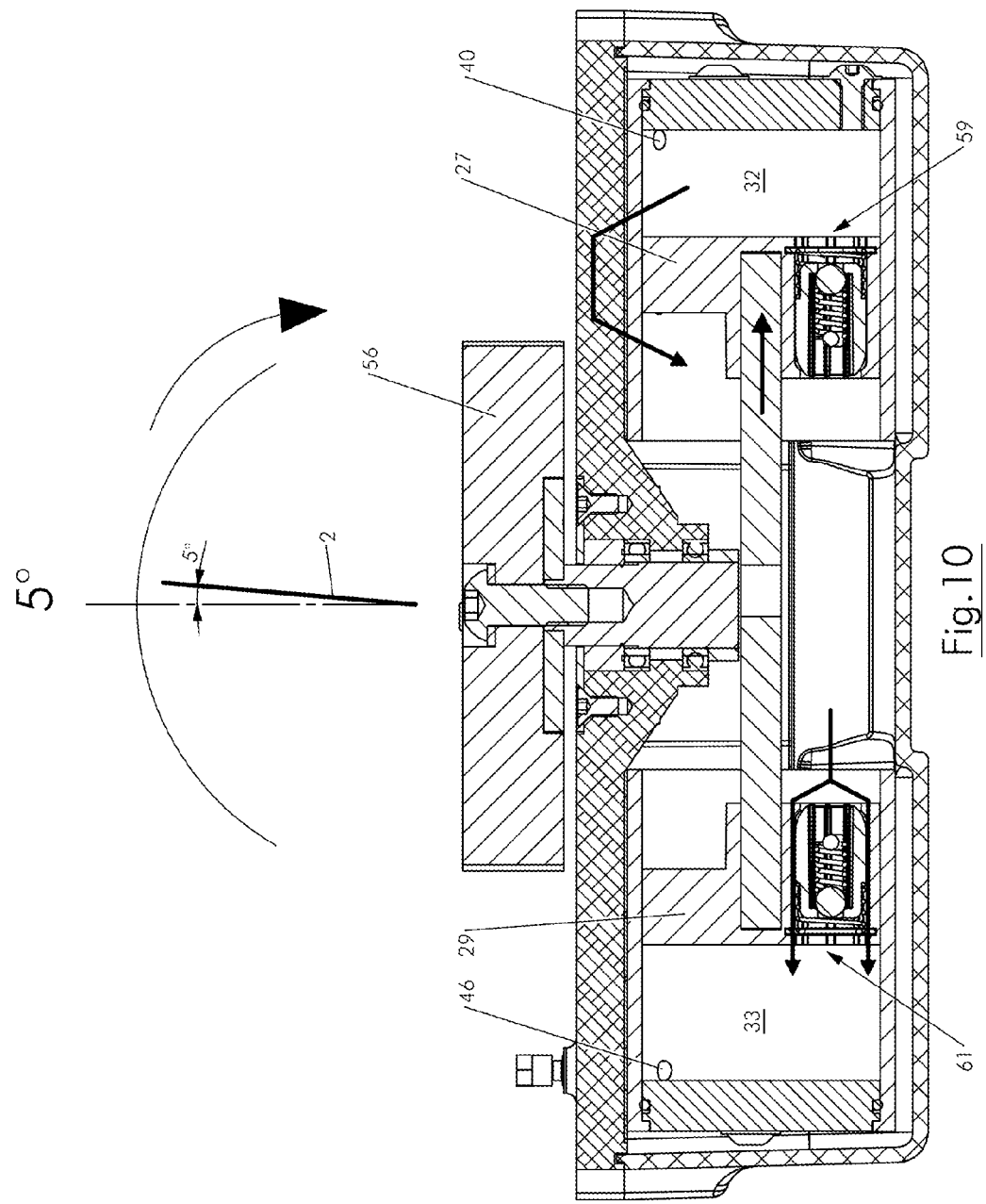
Figure 11:
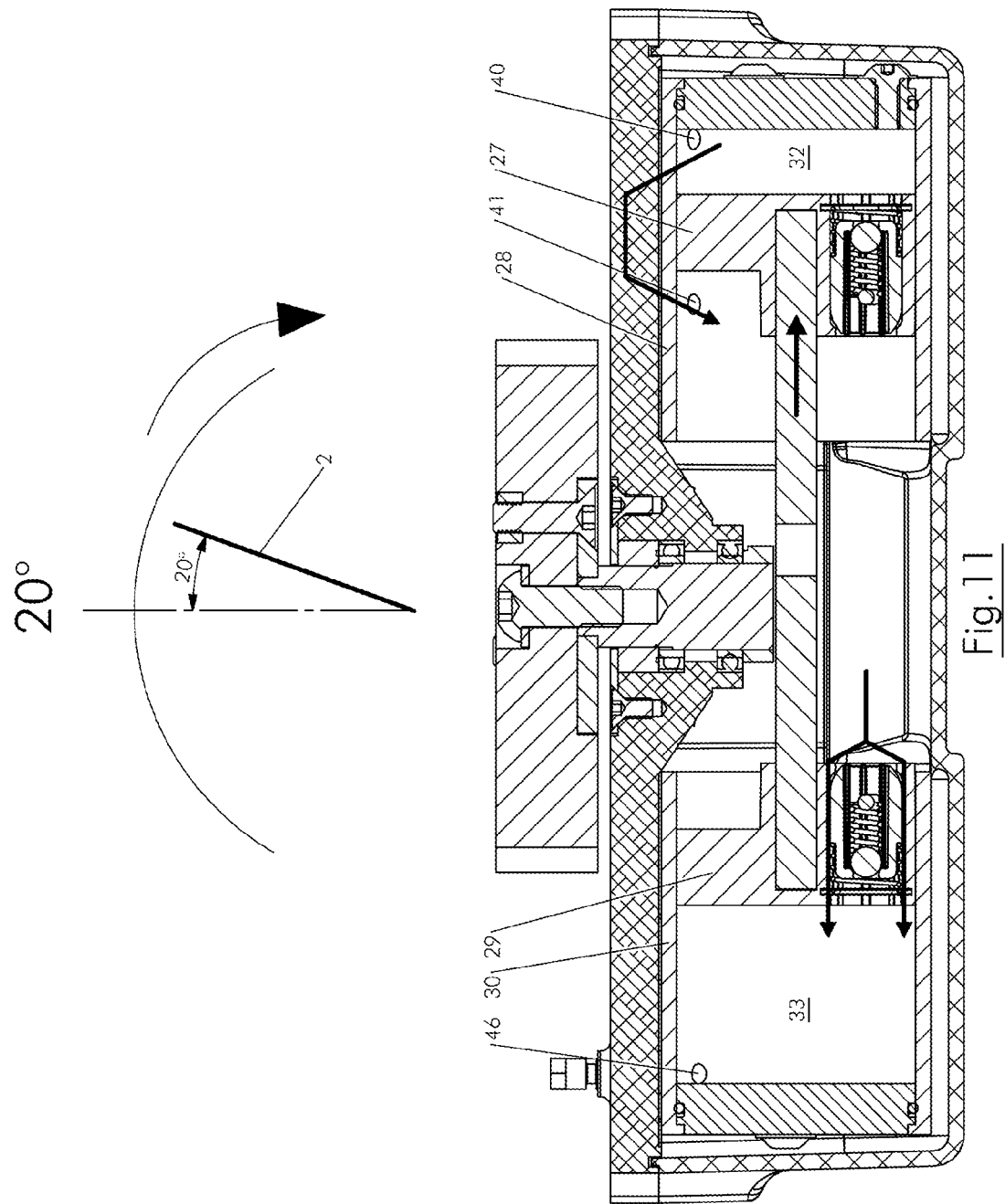

After the turnstile has rotated over 5°, as illustrated in FIG. 10, the first piston 27 starts to pass the outlet 41 of the first by-pass channel 39 so that hydraulic fluid can leave the first cylinder cavity 32 also through the first by-pass channel 39, via the inlet 40 and the outlet 41 thereof. When the first piston 27 has passed the outlet 41 completely (as can be seen in FIG. 11), the rotation of the turnstile is not damped so that the person passing the turnstile can rotate it easily whilst tensioning the springs 20 of the torque-restoring mechanism 13, i.e. whilst storing potential energy in this torque-restoring mechanism 13. The term "not damped" is used in the present specification to indicate that the turnstile is damped considerably less than in a phase of the hydraulic damper wherein it actually damps the rotation of the turnstile, i.e. in a phase wherein no hydraulic fluid flows through the by-pass channel of the cylinder cavity wherein the hydraulic fluid is pressurized.

Figure 12:
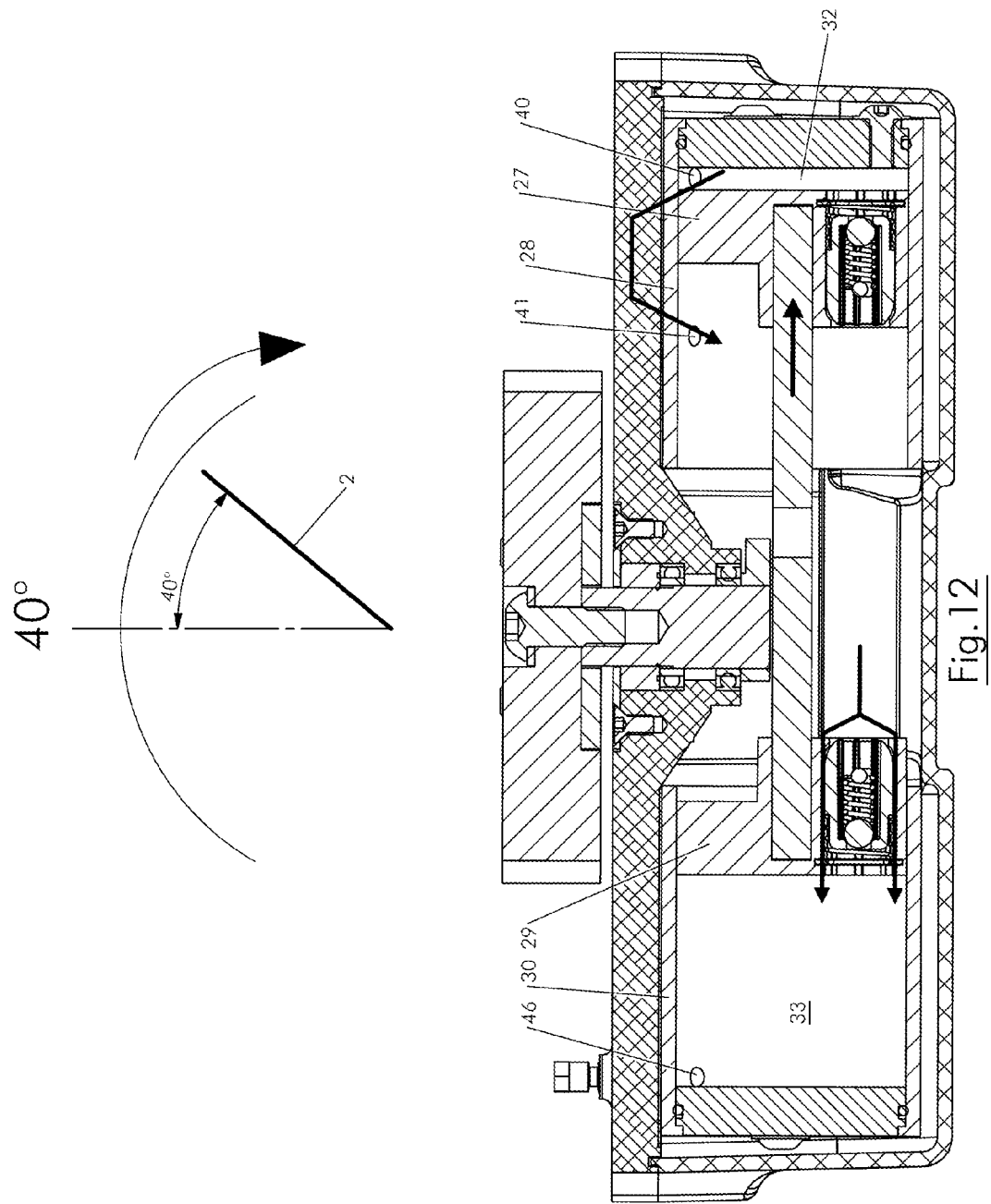
Figure 13:
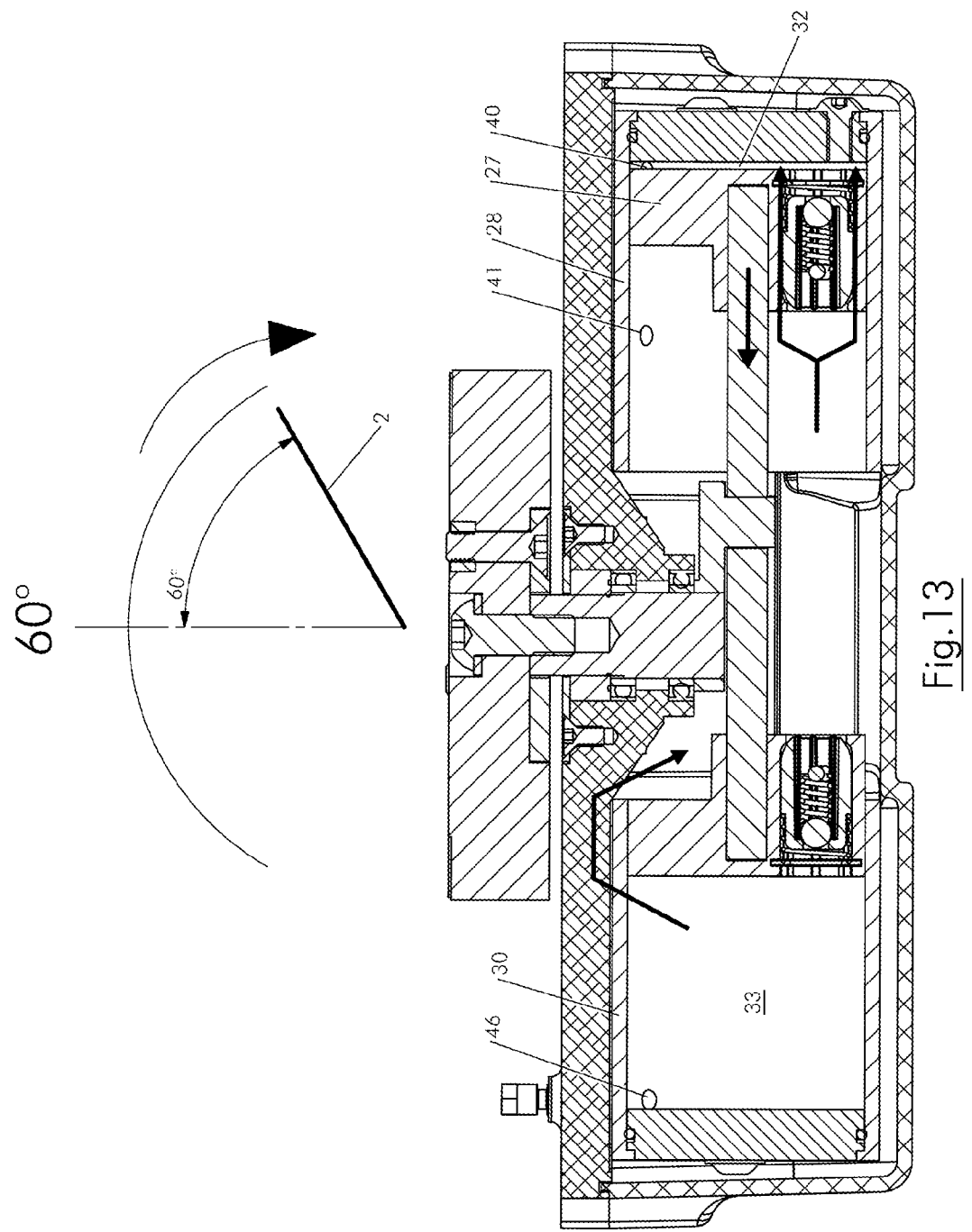
Figure 14:
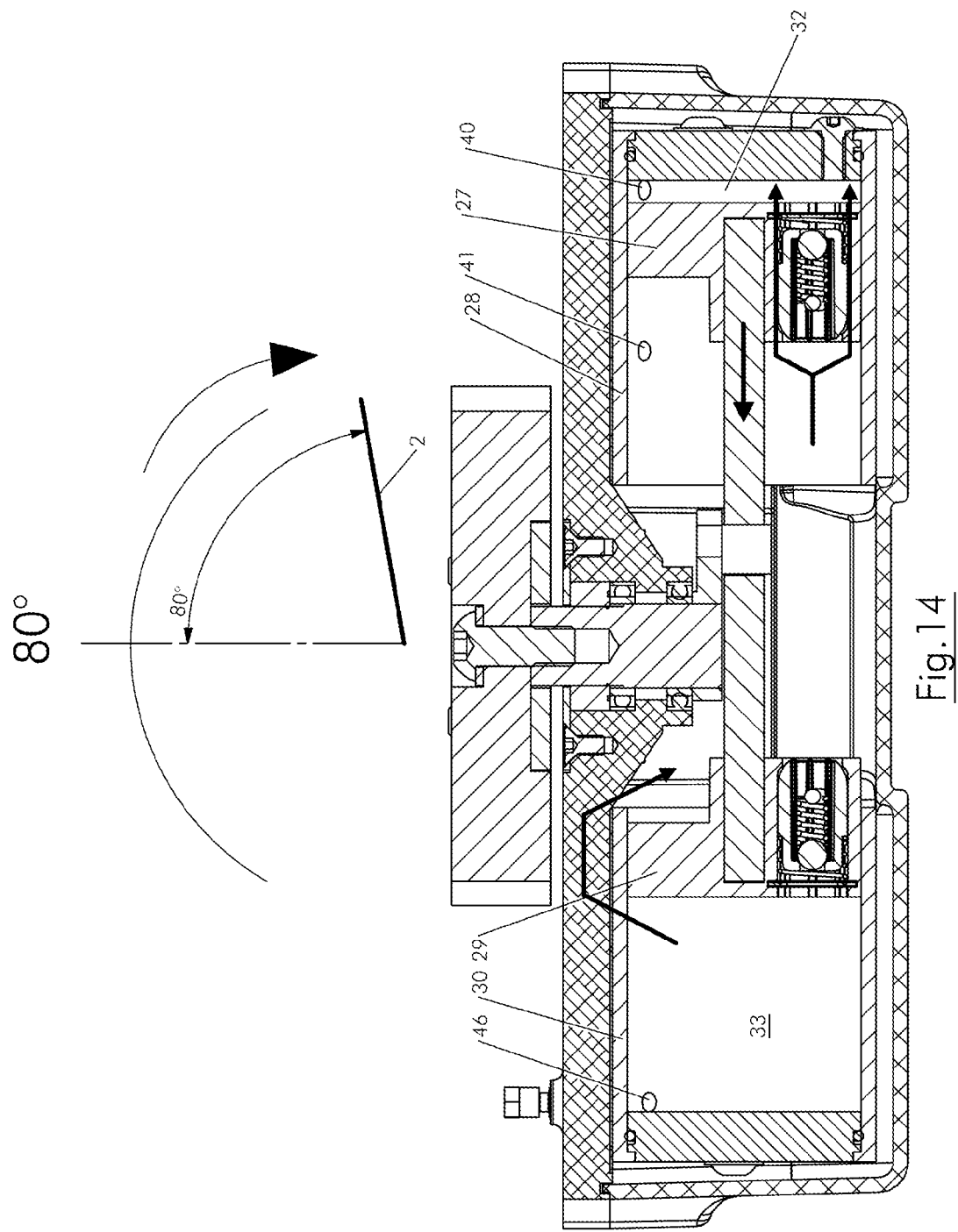
Figure 15:
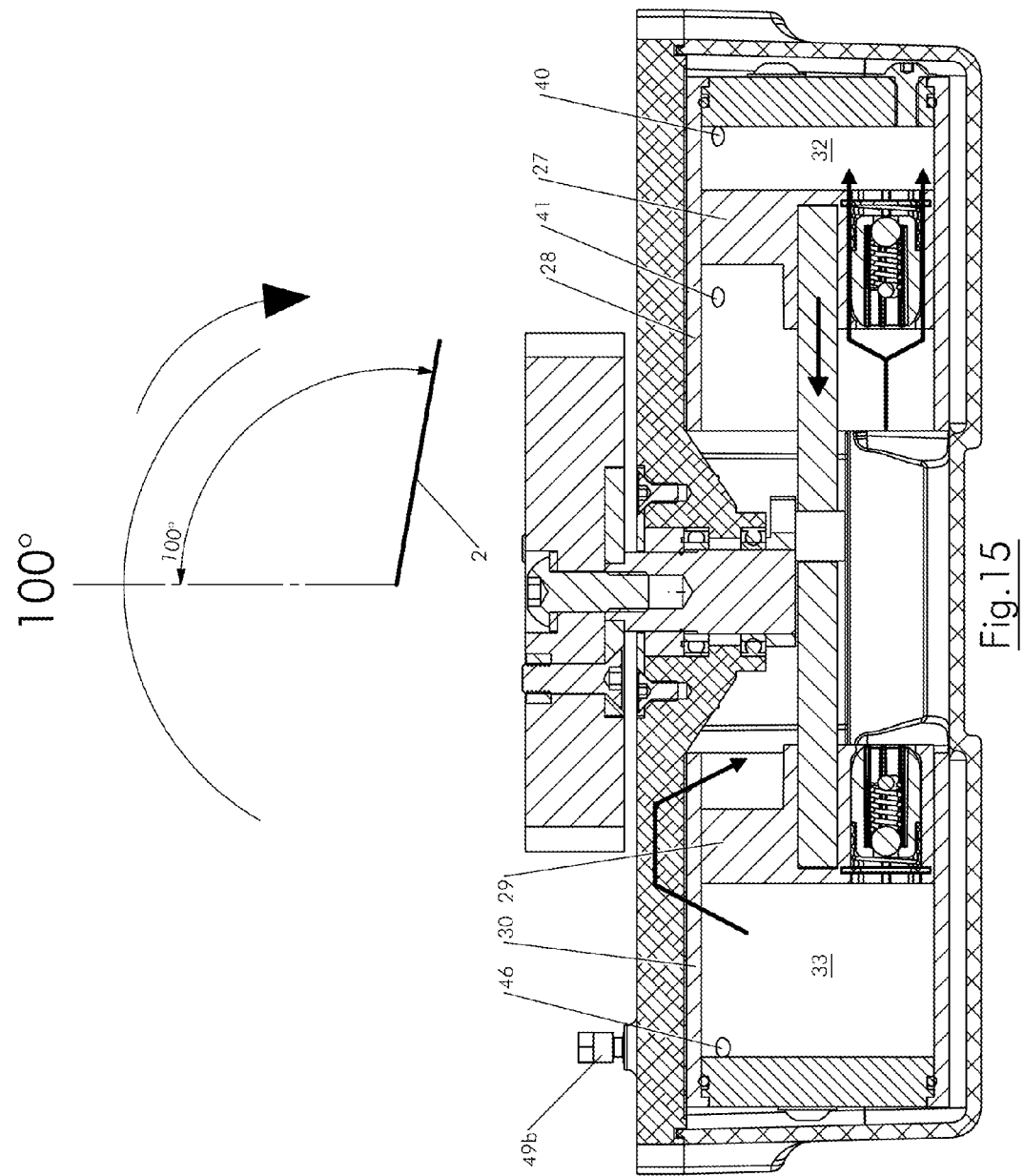
Figure 16:
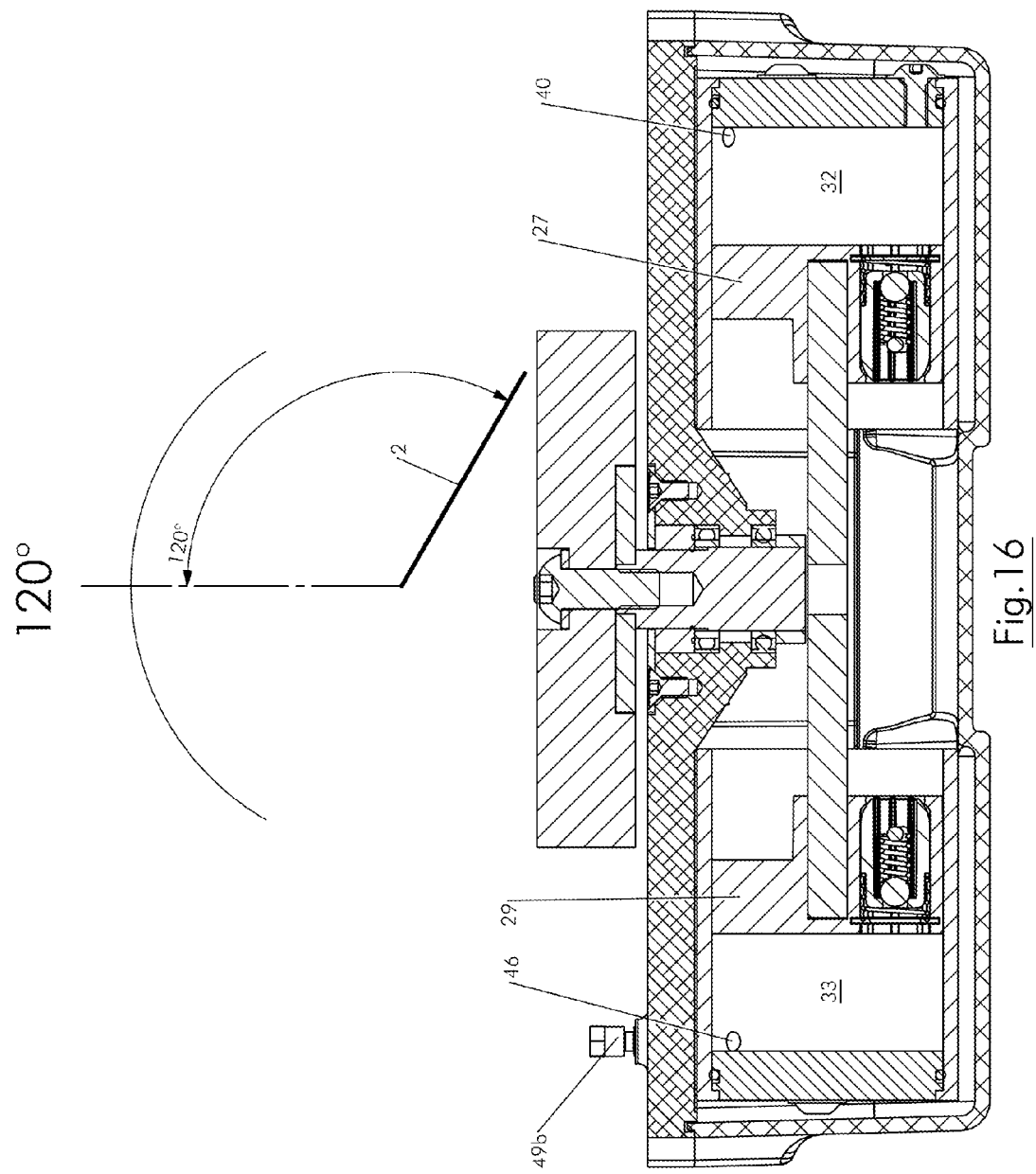

Turning to FIGS. 11 to 13, wherein the turnstile rotates over the first half of its part-rotational movement between two of its successive home positions, i.e. wherein it rotates over 60°, it can be seen that this movement is not damped since the inlet 40 of the first by-pass channel 39 end in the first cylinder cavity 32 is in front of the first piston 27 whilst the outlet 41 of this first by-pass channel 39 end is behind the first piston 27 in the hydraulic damper 26 so that the hydraulic fluid in the first cylinder cavity 32 is not or almost not pressured.

In a next phase, at the end of the first stroke of the first piston 27, the pistons 27 and 29 start moving in the opposite direction, more particularly to the left in FIGS. 13 to 16. The first one-way valve 59 in the first piston 27 is thereby opened whilst the second one-way valve 61 in the second piston 29 is closed. The damping action is thus taken over by the second piston 29. As in the position illustrated in FIG. 13, i.e. at the beginning of the second stroke of the first piston 27, the in- and outlets 43 and 44 of the second by-pass channel 42 are both in the second cylinder cavity 33, no hydraulic fluid can leave this cylinder cavity 33 so that the rotation of the turnstile is damped by the second piston 29. As illustrated in FIGS. 13 to 16, damping of the rotation of the turnstile continues until the turnstile reaches its next home position.

Figure 17:
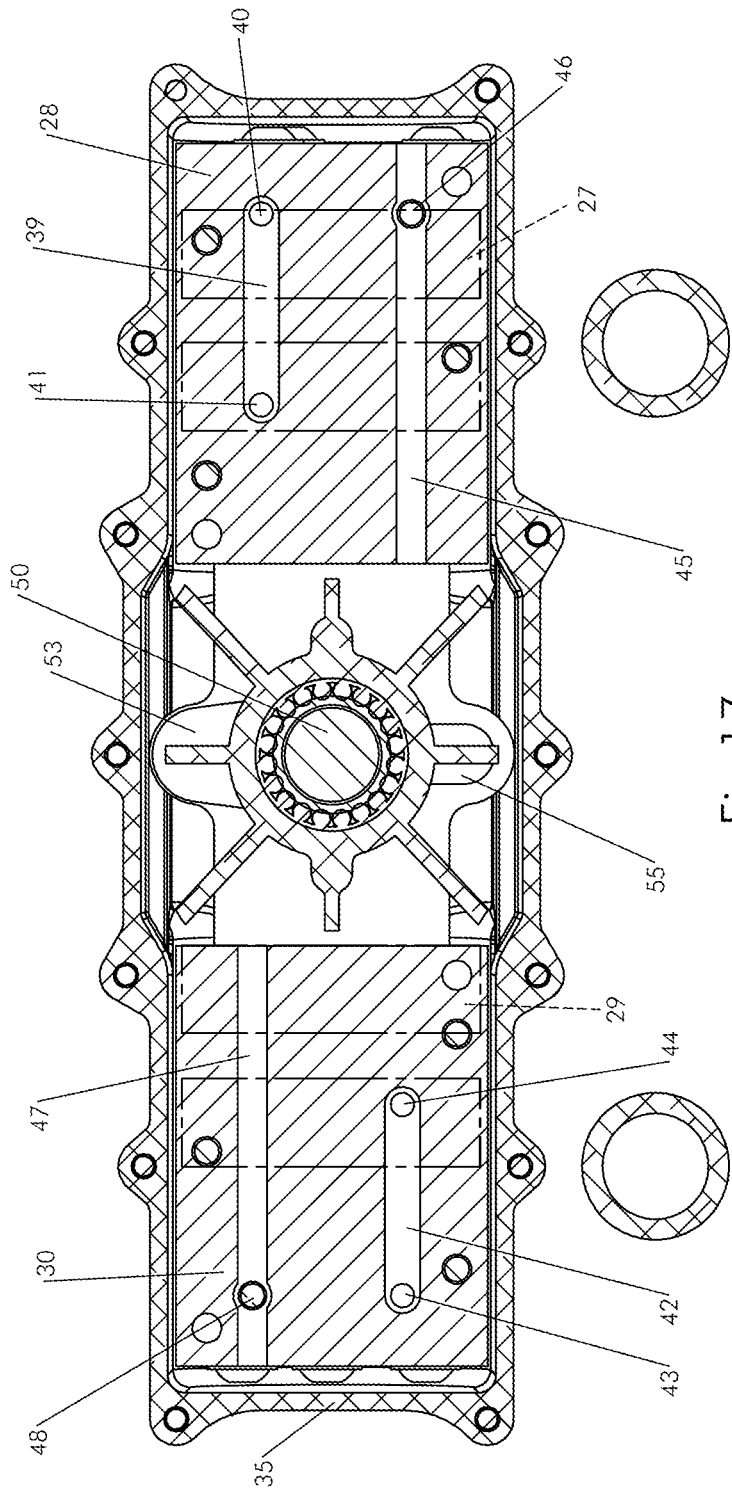
FIG. 17 is a longitudinal sectional view, in a horizontal direction, through the hydraulic damper onto which two different positions of the pistons are shown schematically, for two different angular positions of the turnstile.

In that position, the second piston 29 has not yet passed the outlet 44 of the second by-pass channel 42 (see FIG. 17) so that when, due to its inertia, the turnstile would pass its home position, its movement is still damped so that it will quickly come to a rest. In this way swinging of the turnstile around its rest position is avoided or considerably limited since when the pistons swing to the left, they are damped by the second piston 29 whilst when they swing to the right, they are damped by the first piston 27. Movement of the turnstile starting from its home positions is indeed damped in one direction by the first piston 27 over 5° and in the other direction by the second piston 29 also over 5°.

An important advantage of the cam (or crank) mechanism converting the rotation of the rotating shaft 50 into the reciprocating motion of the pistons 27 and 29 is that at the beginning of the second half of the part-rotational movement of the turnstile between two of its home positions, i.e. in the situation illustrated in FIG. 13, the rotational movement of the turnstile is much less damped than at the end of this part-rotational movement, i.e. when the turnstile reaches its next home position. The rotation speed of the turnstile is thus slowed down gradually. The increased damping effect is due to the fact that by the cam or crank mechanism, at the transition between the first and the second stroke of the first piston 27, the pistons are displaced over a much shorter distance than when the pistons are in the middle of their strokes. This can be seen clearly when comparing the displacement of the pistons between FIGS. 13 and 14 (wherein the turnstile rotates from 60 to 80°) with the displacement of the pistons between FIGS. 15 and 16 (wherein the turnstile rotates from 100 to 120°), which is over this angular rotation of the turnstile on average about 3.7 times larger (and thus even larger closer to the home position of the turnstile). Due to the small damping effects at the beginning of the first and the second strokes of the first piston 27, it is not necessary that the inlets 40 and 43 of the by-pass channels 39 and 42 are provided entirely at the distal extremity of the cylinder cavities 32 and 33 but they might be provided at a small distance thereof so that the damping effect starts already at the end of the first or the second stroke of the first piston 27. Similarly, additional by-pass channels could be provided at the opposite sides of the cylinder cavities enabling the hydraulic fluid to leave the first cylinder cavity 32 at the beginning of the first stroke of the first piston 27 or the second cylinder cavity 33 at the beginning of the second stroke of the first piston 27 so that at the beginning of the second half of the part-rotational movement of the turnstile, i.e. when the torque-restoring mechanism starts to rotate the turnstile, the movement of the turnstile is even less damped. This may be advantageous since, due to the angular position of the cam member 14, the torque-restoring mechanism initially only exerts a very small torque onto the turnstile.

The damping effect of the control assembly illustrated in the drawings can be adjusted by means of the two flow control valves 49a and b provided in the first and second damping channels 45 and 47. A problem with hydraulic dampers is that their damping effect varies with the temperature due to the varying viscosity of the hydraulic fluid. To solve this problem, the damping outlets, which allow a restricted flow of hydraulic fluid out off the cylinder cavities 32 and 33 when it is pressurized therein, are not only formed by the first and second damping channels 45 and 47 but also by a first gap formed by a clearance between the first piston 27 and the first cylinder 28 and by a second gap formed by a clearance between the second piston 29 and the second cylinder 30. The first and second cylinders 28, 30 are made of a first material and the first and second pistons 27, 29 of a second material which has a larger thermal expansion coefficient than the material of the cylinders 28, 30 so that the gaps between the piston and the cylinder decrease when the temperature of the damper is raised and increase when the temperature of the damper is lowered. The first material may for example be aluminium, having a theoretical linear thermal expansion coefficient of $2.3 \times 10^{-5}$ $K^{-1}$, whilst the second material may for example be polyoxymethylene (POM) sold under the brand Hostaform® C9021 and having a theoretical linear thermal expansion coefficient of $9 \times 10^{-5}$ $K^{-1}$. For further details about these temperature compensating measures are described in WO 2011/023793, which is incorporated herein by way of reference.

When such temperature dependent gaps are provided between the pistons and the cylinders in the control assembly illustrated in the figures, it is clear that in the phases wherein the movement of the turnstile is damped, in particular in the phases illustrated in FIGS. 9 and 13 to 16, the pressurized hydraulic fluid cannot only flow via the damping channel 45 or 47 out of the cylinder cavity 32 or 33 but also via the gap between the piston 27 or 29 and the respective cylinder 28 or 30.

In FIGS. 18 to 19 an alternative embodiment of the control assembly is shown, more particularly a control assembly adapted to a waist-height turnstile, the rotating shaft 1 of which is inclined (over 45° with respect to a vertical line). In this embodiment the control assembly is also inclined so that its hub 8 fits again onto the rotating shaft 1 (the rotation axis of the hub 8 being thus also inclined over 45° with respect to a vertical line). To avoid loss of hydraulic fluid out off the hydraulic damper 26, this hydraulic damper is inclined (over 45°) with respect to the frame 7 so that its lid 36 is again in a substantially horizontal position and the rotation axis of its rotating shaft 50 is again parallel to the rotation axis of the rotary shaft 1 of the turnstile. The first gearwheel 56 on the hydraulic damper 26 and the second gearwheel 57 on the hub 8 are conical to enable them to engage one another in the inclined position of the hydraulic damper 26 with respect to the hub 8.

The invention claimed is:

1. A control assembly for controlling the rotation of a turnstile comprising a rotary shaft (1) with barrier arms (2) spaced over an angle of x° from one another, which control assembly comprises:

a frame (7);

a hub (8) on which the turnstile is adapted to rotate and which is rotatably mounted onto said frame (7);

a torque-restoring mechanism (13) defining 360/x home positions of said turnstile and restoring torque, which has been exerted onto the turnstile during substantially a first half of a part-rotational movement of the turnstile from one of said home positions to a next home position, during substantially a second half of said part-rotational movement so as to assist the rotation of the turnstile to said next home position; and a hydraulic damper (26) for damping the movement of the said turnstile during the second half of said rotational movement, which damper (26) comprises a cylinder-piston mechanism which contains a hydraulic fluid, characterised in that the cylinder-piston mechanism of the hydraulic damper (26) is a double cylinder-piston mechanism which comprises:

a first piston (27) reciprocating in a first cylinder (28) and defining with the first cylinder (28) a first cylinder cavity (32) having a maximum size at the beginning of a first stroke of the first piston (27), a minimum size at the end of this first stroke and a maximum size at the end of a subsequent second stroke of the first piston (27); and a second piston (29) reciprocating in a second cylinder (30) and defining with the second cylinder (29) a second cylinder cavity (33), the second piston (29) being coupled to the first piston (27) to reciprocate simultaneously with the first piston (27) so that said second cylinder cavity (33) has a minimum size at the beginning of said first stroke of the first piston (27), a maximum size at the end of said first stroke and a minimum size at the end of said subsequent second stroke of the first piston (27), in that the first and second pistons (27, 29) are operatively connected to said hub (8) via a motion converting transmission (50-57) converting said part-rotational movement of the turnstile over x° between two successive home positions into a reciprocating motion of the first piston (27) starting substantially in the middle of one of said first and said second strokes and ending substantially in the middle of the other one of said first and second strokes;

in that the first cylinder cavity (32) has a first inlet (58) which is provided with a first one-way valve (59) allowing flow of hydraulic fluid into the first cylinder cavity (32) during said second stroke of the first piston (27) and the second cylinder cavity (33) has a second inlet (60) which is provided with a second one-way valve (61) allowing flow of hydraulic fluid into the second cylinder cavity (33) during said first stroke of the first piston (27);

in that the first cylinder (28) has a first damping outlet (45) allowing a restricted flow of hydraulic fluid out off the first cylinder cavity (32) at least during a first part of said first stroke of the first piston (27);

in that the second cylinder (30) has a second damping outlet (47) allowing a restricted flow of hydraulic fluid out off the second cylinder cavity (33) at least during a first part of said second stroke of the first piston (27);

in that the first cylinder (28) is provided with a first by-pass channel (39) having an inlet (40) and an outlet (41) ending both in said first cylinder cavity (32) at the beginning of said first stroke of the first piston (27), the first by-pass channel (39) allowing flow of hydraulic fluid out off the first cylinder cavity (32) when the first piston (27) has passed the outlet (41) of the first by-pass channel (39) during a second part of said first stroke of the first piston (27); and in that the second cylinder (30) is provided with a second by-pass channel (42) having an inlet (43) and an outlet (44) ending both in said second cylinder cavity (33) at the beginning of said second stroke of the first piston (27), the second by-pass channel (42) allowing flow of hydraulic fluid out off the second cylinder cavity (33) when the second piston (29) has passed the outlet (44) of the second by-pass channel (42) during a second part of said second stroke of the first piston (27).

2. A control assembly according to claim 1, characterised in that said motion converting transmission (50-57) comprises a rotating shaft (50) entering said cylinder-piston mechanism, in particular through an opening (51) in an upper side thereof, and a motion converting mechanism (52-55) between said rotating shaft (50) and said first and second pistons (27, 29) which is contained in said cylinder-piston mechanism and which converts a rotational motion of said rotating shaft (50) into said reciprocating motion of said first and second pistons (27, 29).

3. A control assembly according to claim 2, characterised in that said motion converting mechanism (50-57) is a cam mechanism, said rotating shaft being a camshaft (50) comprising at least one cam (52) and actuating said first and second pistons (27, 29) through the intermediary of at least one piston rod (31), said cam (52) comprising preferably a projection (54) reciprocating in a transverse groove (55) in the piston rod (31).

4. A control assembly according to claim 2, characterised in that said motion converting mechanism (50-57) is a crank mechanism, said rotating shaft being a crankshaft comprising at least one crank which is connected by means of at least one piston rod to said first and second pistons.

5. A control assembly according to claim 2, characterised in that said double cylinder-piston mechanism is filled with said hydraulic fluid.

6. A control assembly according to claim 2, characterised in that said motion converting transmission (50-57) comprises a gearing (56-57) between said rotating shaft (50) and said hub (8), which gearing (56-57) is a multiplying gearing so that a rotation of said turnstile over x° causes a rotation of said rotating shaft (50) over 180°, said multiplying gearing comprising preferably a gear wheel (56) mounted onto said rotating shaft (50) and a further gear wheel (57) mounted onto said hub (8) and engaging said gear wheel (56), the ratio of the number of teeth on said gear wheel (56) to the number of teeth on said further gear wheel (57) being equal to x/180.

7. A control assembly according to claim 1, characterised in that said first and second pistons (27, 29) are each mounted on one of two opposite extremities of a common piston rod (31).

8. A control assembly according to claim 1, characterised in that the outlets (41, 44) of the first and the second by-pass channels (39, 42) are provided in such locations in said first and second cylinders (28, 30) that said first piston (27) passes the outlet (41) of said first by-pass channel (39), and second piston (29) the outlet (44) of said second by-pass channel (42), only after the turnstile has been rotated to have passed one of said home positions by at least 1°, preferably by at least 2° and more preferably by at least 3°, but preferably before the turnstile has been rotated to have passed said home position by less than 15° and preferably by less than 10°.

9. A control assembly according to claim 1, characterised in that said torque-restoring mechanism (13) comprising a rotating cam member (14) operatively secured to said hub (8) and at least one cam follower (15) which cooperates with the rotating cam member (14), the cam member (14) and the cam follower (15) defining the 360/x home positions of said turnstile, with the cam follower (15) being normally urged by resilient means (20) into engagement with said cam member (14) for generally biasing said turnstile to one of said home positions so that during substantially said first half of said part-rotational movement of the turnstile from one of said home positions to said next home position potential energy is stored in said resilient means (20) and said potential energy is converted into kinetic energy of said turnstile during substantially the second half of said part-rotational movement so as to assist the rotation of the turnstile to said next home position.

10. A control assembly according to claim 1, characterised in that said first damping outlet comprises a first damping channel (45) provided with a first adjustable flow control valve (49a) and said second damping outlet comprises a second damping channel (47) provided with a second adjustable flow control valve (49b).

11. A control assembly according to claim 1, characterised in that said first damping outlet comprises a first gap formed by a clearance between the first piston (27) and the first cylinder (28) and said second damping outlet comprises a second gap formed by a clearance between the second piston (29) and the second cylinder (30), the first and second cylinders (28, 30) being preferably made of a first material and the first and second pistons (27, 29) of a second material which has a larger thermal expansion coefficient than said first material.

12. A control assembly according to claim 1, characterised in that it comprises a ratchet mechanism for controlling the general direction of allowable rotation of the turnstile, which ratchet mechanism comprises at least one rotating notched circular member (16) operatively connected to said hub (8) and at least two locking pawls (21, 22) each movable between a locking and an unlocking position, said locking pawls including a first locking pawl (21) enabling, in its locking position, rotation of the turnstile in a first direction but locking the turnstile for rotation in a second direction, which is opposite to said first direction, and a second locking pawl (22) enabling, in its locking position, rotation of the turnstile in said second direction but locking the turnstile for rotation in said first direction.

13. A control assembly according to claim 12, characterised in that it comprises an access control mechanism enabling to move said first locking pawl between its locking and unlocking positions and to move said second locking pawl between its locking and unlocking positions, said access control mechanism comprising preferably a first electromagnet (24) for moving said first locking pawl (21) from its locking position to its unlocking position or vice versa against the action of a first resilient member and a second electromagnet (25) for moving said second locking pawl (22) from its locking position to its unlocking position or vice versa against the action of a second resilient member.

14. A control assembly according to claim 1, characterised in that said hydraulic fluid comprises hydraulic oil.

15. A turnstile comprising a rotary shaft (1) with barrier arms (2) spaced over an angle of x° from one another, characterised in that the turnstile is provided with a control assembly as claimed in claim 1.

* * * * *